US012643360B2

(12) United States Patent
De Rycke

(10) Patent No.: US 12,643,360 B2
(45) Date of Patent: Jun. 2, 2026

(54) SPRING DEVICE FOR A WHEEL SUSPENSION FOR A VEHICLE

(71) Applicant: TWIN TECH BV, Deinze (BE)

(72) Inventor: Stefan De Rycke, Olsene (BE)

(73) Assignee: TWIN TECH BV, Deinze (BE)

( * ) Notice: Subject to any disclaimer, the term of this patent is extended or adjusted under 35 U.S.C. 154(b) by 412 days.

(21) Appl. No.: 18/010,037

(22) PCT Filed: Aug. 5, 2021

(86) PCT No.: PCT/IB2021/057181
§ 371 (c)(1),
(2) Date: Dec. 13, 2022

(87) PCT Pub. No.: WO2022/029667
PCT Pub. Date: Feb. 10, 2022

(65) Prior Publication Data
US 2023/0226867 A1 Jul. 20, 2023

(30) Foreign Application Priority Data
Aug. 5, 2020 (BE) .................................. 2020/5559

(51) Int. Cl.
*B60G 11/62* (2006.01)
*B60G 3/14* (2006.01)
(Continued)

(52) U.S. Cl.
CPC .............. *B60G 11/62* (2013.01); *B60G 3/145* (2013.01); *B60G 17/0277* (2013.01);
(Continued)

(58) Field of Classification Search
CPC ...... B60G 11/62; B60G 11/22; B60G 17/052; B60G 17/0277; B60G 3/145; B60G 2200/132; B60G 2202/412; B60G 2202/442; B60G 2206/42; B60G 2500/30; B60G 2800/162; B60G 2800/914; F16F 13/002; F16F 2222/126; F16F 2236/08; F16F 2232/02; F16F 2228/066; F15B 11/08
See application file for complete search history.

(56) References Cited

U.S. PATENT DOCUMENTS 8,641,079 B2 2/2014 Dunlap et al.

FOREIGN PATENT DOCUMENTS

DE 81 18 93 C 8/1951
DE 4129916 C1 * 1/1993 .............. F16F 1/545
(Continued)

OTHER PUBLICATIONS

International Search Report and Written Opinion mailed on Nov. 10, 2021 issued in PCT International Patent Appln. No. PCT/IB2021/057181.

*Primary Examiner* — Vishal R Sahni
(74) *Attorney, Agent, or Firm* — Amster, Rothstein & Ebenstein LLP

(57) ABSTRACT
A spring device (100) for a wheel suspension (200) for a vehicle (300) is described. The spring device (100) comprises an elongated elastic torsion device (102) configured to rotate about a central longitudinal axis (R) at a load (L). The torsion device (102) comprises elongated elastic elements (130) that comprise an internal cavity (132).

18 Claims, 15 Drawing Sheets

(51) Int. Cl.

| | |
|---|---|
| *B60G 17/027* | (2006.01) |
| *B60G 17/052* | (2006.01) |
| *F15B 11/08* | (2006.01) |
| *F16F 1/54* | (2006.01) |
| *F16F 13/00* | (2006.01) |

(52) U.S. Cl.

CPC ............ *B60G 17/052* (2013.01); *F15B 11/08* (2013.01); *F16F 1/545* (2013.01); *F16F 13/002* (2013.01); *B60G 2200/132* (2013.01); *B60G 2202/412* (2013.01); *B60G 2202/442* (2013.01); *B60G 2206/42* (2013.01); *B60G 2500/30* (2013.01); *B60G 2800/162* (2013.01); *B60G 2800/914* (2013.01); *F16F 2222/126* (2013.01); *F16F 2228/066* (2013.01); *F16F 2232/02* (2013.01); *F16F 2236/08* (2013.01)

(56)          References Cited

FOREIGN PATENT DOCUMENTS

| | | | | |
|---|---|---|---|---|
| DE | 44 38 217 A1 | 5/1996 | | |
| DE | 10 2005 033887 A1 | 1/2007 | | |
| DE | 202013009443 U1 * | 11/2013 | ........... | B60G 11/225 |
| DE | 20 205 008166 U1 | 12/2015 | | |

\* cited by examiner

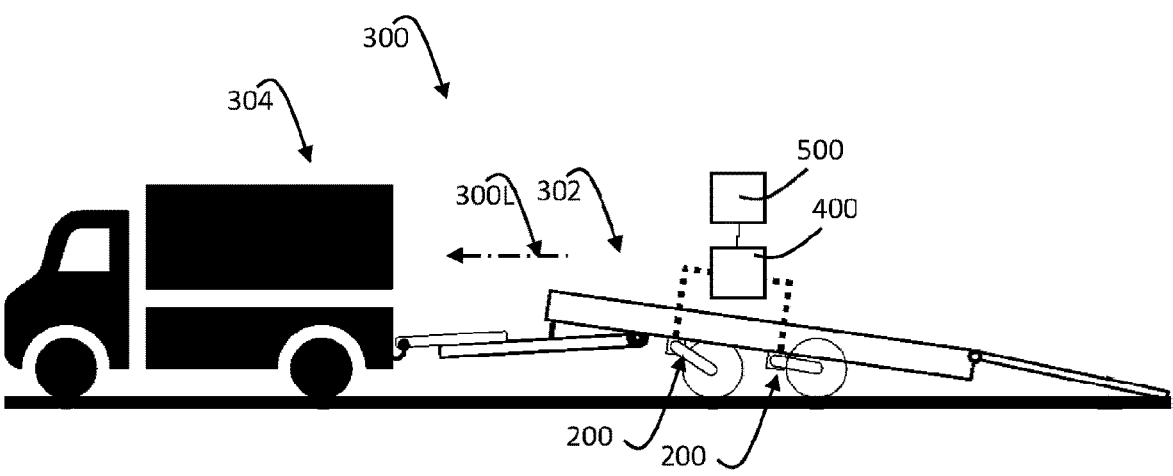
Fig. 9
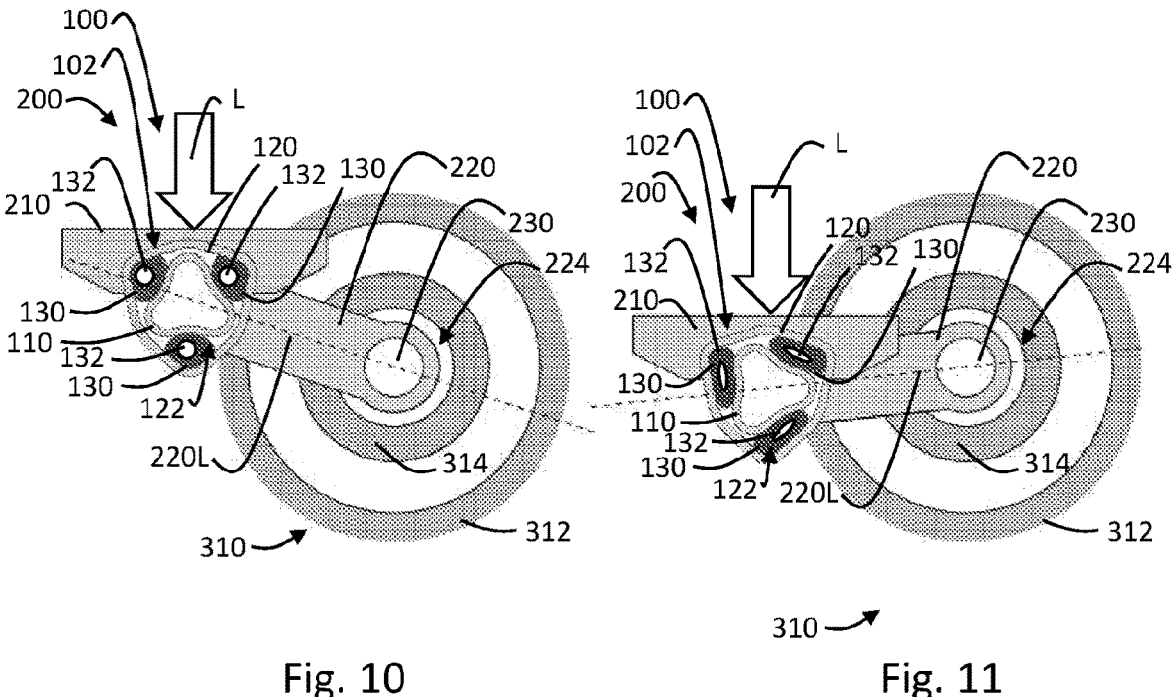
Fig. 10                                    Fig. 11

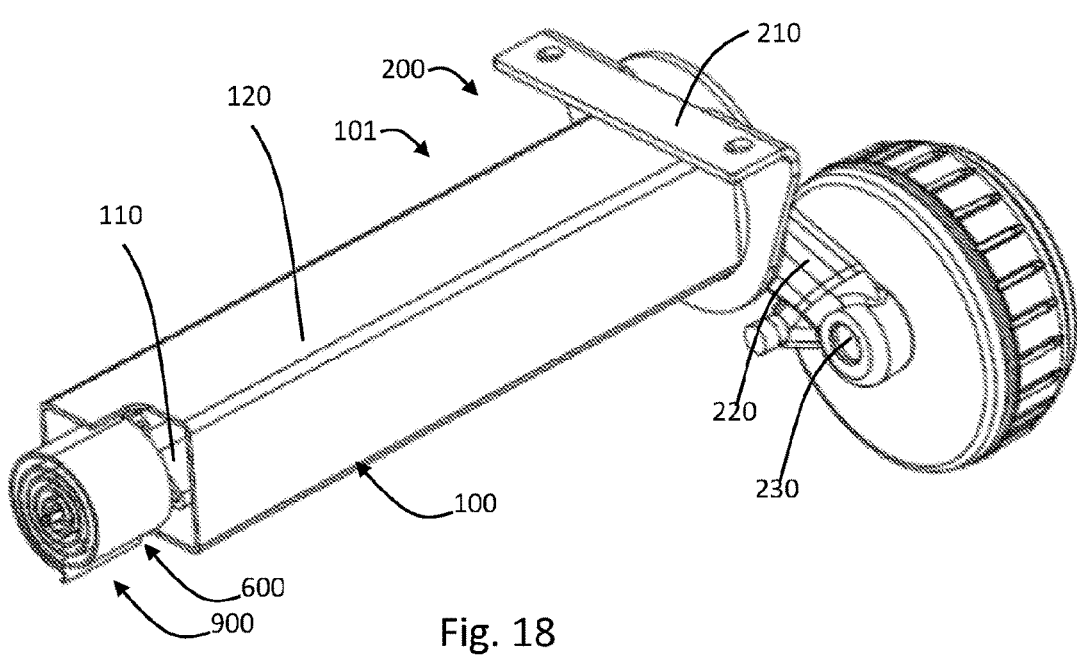
Fig. 18
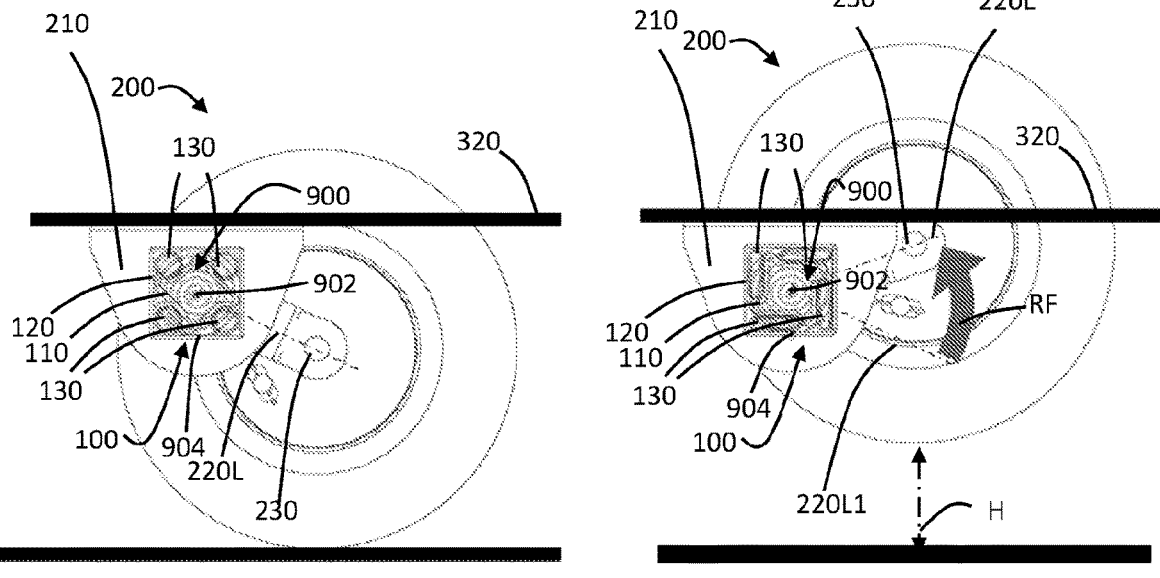
Fig. 19
Fig. 20

-20°       0°       25°       50°

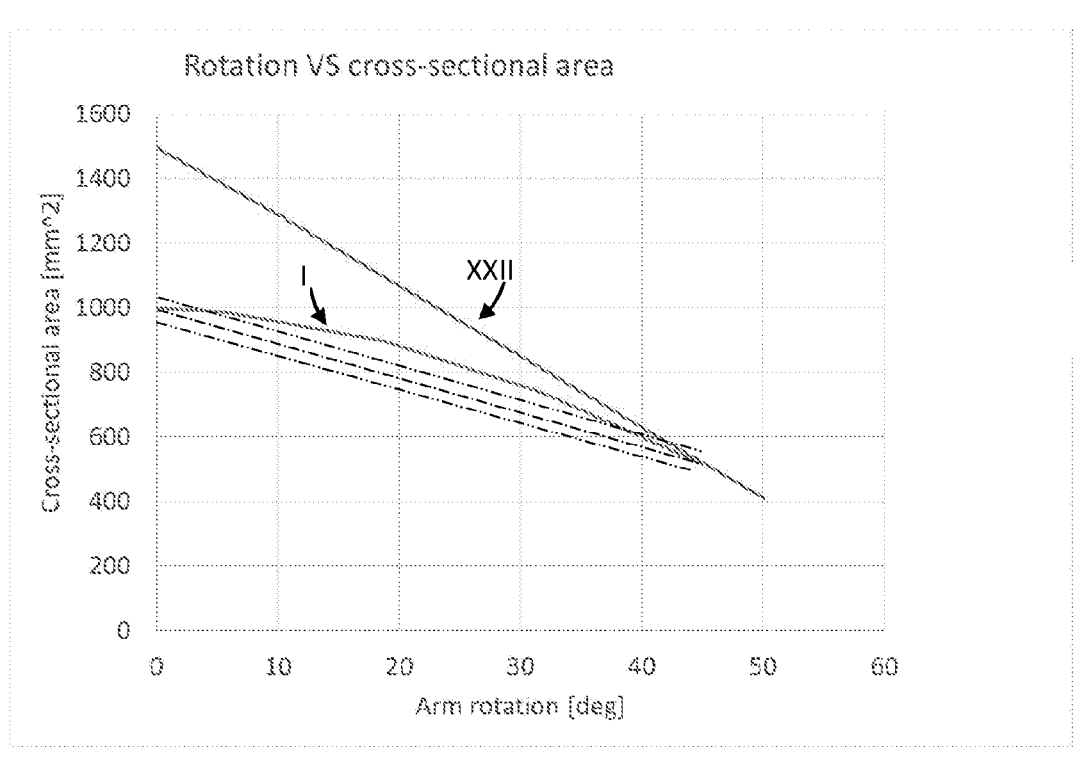
Fig. 29
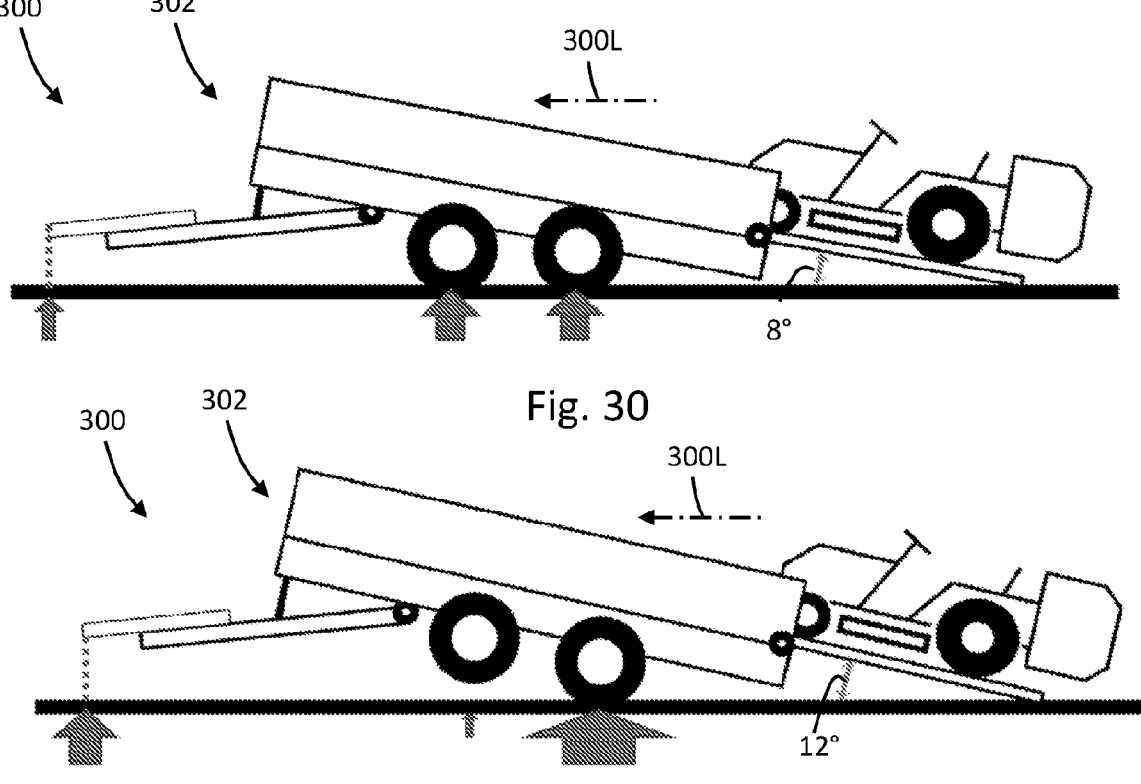
Fig. 30
Fig. 31

SPRING DEVICE FOR A WHEEL SUSPENSION FOR A VEHICLE

CROSS-REFERENCE TO RELATED APPLICATIONS

This application is a U.S. national stage entry under 35 U.S.C. § 371 of PCT International Patent Application No. PCT/IB2021/057181, filed Aug. 5, 2021, which claims priority to Belgian Patent Application No. 2020/5559, filed Aug. 5, 2020, the contents of each of which are incorporated herein by reference in their entirety.

The technical domain concerns the domain of spring devices for a wheel suspension for a vehicle. More specifically, a spring device comprising an elastic torsion device.

A spring device comprising an elastic torsion device, also called torsion axle or torsion axle with rubber strands or cords, is known, for example, from U.S. Pat. No. 8,641,079. The known torsion axle is part of a wheel suspension for the wheels of a vehicle. Since the rubber strands are elastic, they are compressible, allowing rotational movement of the torsion device under the influence of the load applied to the wheel suspension. Typically, the rotation of the torsion device is limited to a maximum of 45°. For adapting the configuration of such spring devices, for example in the context of a multi-axle vehicle, for adapting the spring constant of the spring device as a function of the load, or for adapting the distance to the ground surface, such known devices typically require additional mechanisms and actuators. Such known devices are described, for example, in U.S. Pat. No. 8,317,215B2 or US2014225342A1. Another known alternative consists in choosing the type and/or material of the rubber strands in function of the desired spring constant, however, this is a complex, time-consuming operation that is typically only performed during the initial manufacturing of the spring device.

There is therefore a need for a flexible, simpler and robust spring device which overcomes the aforementioned drawbacks.

SUMMARY

According to a first aspect, a spring device is provided for a wheel suspension for a vehicle, the spring device comprising an elongated elastic torsion device configured to rotate about a central longitudinal axis under a load, the torsion device comprising:

an elongated internal profile having a longitudinal axis along the central longitudinal axis;

an elongated external profile comprising an elongated cavity having a longitudinal axis along the central longitudinal axis, at least three elongated elastic elements having a longitudinal axis parallel to the central longitudinal axis;

wherein the internal profile and the elongated elastic elements are at least partially located in the cavity of the external profile, and wherein the elongated elastic elements are arranged, respectively, at different angular positions around the central longitudinal axis between the internal profile and the external profile, so that a rotation about the central longitudinal axis under load is realized by an elastic deformation of the elongated elastic elements,

CHARACTERIZED BY the elongated elastic elements comprising an internal cavity.

Thus a spring device is realized in a simple and robust manner, which allows in a flexible manner to adjust, for example, the spring constant and/or the angular position of the torsion device by means of the pressure of the gas in the internal cavity of the elongated elastic elements. Preferably, the internal cavity of the elongated elastic elements is a gas-filled internal cavity. Furthermore it is also understood that such a spring device, in addition to a rotary resilient action, by means of the elongated elastic elements is also capable of exhibiting a resilient action with respect to static and dynamic loads by means of a translation of the internal profile with respect to of the external profile or vice versa, for example according to a direction transverse to the central longitudinal axis. This means, for example, when the spring device is used in a wheel suspension of a vehicle that a load, for example a dynamic load caused by a bump, a traffic island, etc., in addition to the rotary resilient action as described in more detail below, also allows a resilient translation of the internal profile, for example with a component in a vertical direction and/or a horizontal direction transverse to the central longitudinal axis, which allows, for example, to better absorb shocks without a risk of deformation or damage to bearings or other elements usually present in known air suspensions.

According to one embodiment, the internal cavity of the elongated elastic elements is configured for comprising a pressurized gas.

Preferably, according to embodiments mentioned below, a spring device having a specific surface area with limited variation can be realized in a simple manner. This allows realizing a limited variation in the reaction moment in the operating range of the spring device. This is particularly advantageous for evenly distributing the load over a plurality of spring devices located in different angular positions, for example in a vehicle having a plurality of wheel axles.

According to a preferred embodiment, the internal profile comprises at least one bulge or projection in the direction of the external profile which abuts on one side of a respective elastic element.

According to a preferred embodiment, a spring device is provided, wherein the external profile comprises at least one projection in the direction of the internal profile which abuts on the opposite side of a respective elastic element.

According to a preferred embodiment, a spring device is provided, wherein each of the elastic elements is partially bounded on two opposite sides by the projection of the internal profile and the projection of the external profile, respectively.

According to a preferred embodiment, a spring device is provided, wherein the projections are configured so that upon angular displacement in the operating range of the spring device, the effective area of the spring device exhibits a variation of 50% or less, preferably 25% or less, preferably 10% or less, and wherein the operating range is preferably 20° or more, preferably 30° or more, preferably more than 45°.

According to a preferred embodiment, a spring device is provided, wherein the projections are configured so that in the operating range of the spring device, the course of the cross-sectional area and/or the volume of the internal cavity of the elastic elements as a function of the angular displacement of the internal profile with respect to the external profile of the spring device, has a course that deviates 5% or less from a linear course, preferably 3% or less, preferably 2% or less, for example 1% or less, that is preferably equal to or substantially equal to a linear course.

According to a preferred embodiment, a spring device is provided, wherein the respective projection comprises a radial part:

against which the elastic element can abut; and that extends over a distance in a radial direction which is greater than half the distance between the internal profile and the external profile at the level of the elastic element, preferably in the range from 55% to 95%, preferably in the range from 60% to 90%, preferably in the range from 75% to 85%.

According to a preferred embodiment, a spring device is provided, wherein the spring device at the radial part of the respective projection of the internal profile or the external profile according to the radial direction comprises a respective gap between the respective projection and the internal periphery of the external profile or the external periphery of the internal profile, and wherein the respective opening is configured to allow the elastic element, and preferably the internal cavity thereof, to expand through this opening beyond the angular position of the radial part.

According to a preferred embodiment, a spring device is provided, wherein the respective projection at the end of the respective radial part closest to the external profile 120 or the internal profile respectively has a respective tangential part extending along a direction which is 15° or less from the tangential direction.

According to one embodiment, a spring device is provided, wherein the internal cavities of the respective elongated elastic elements are elongated and comprise a longitudinal axis parallel to the central longitudinal axis.

This allows to insert the elastic elements in a simple manner, and allows to adapt a known torsion device in a simple manner by applying these specific elongated elastic elements.

According to one embodiment, a spring device is provided wherein the length of the internal cavity is in the range of 50% or more of the length of the elongated elastic element.

In this way a sufficiently large gas volume can nevertheless be realized in a small cavity between the two profiles to be able to develop a sufficiently large force on a sufficiently large surface.

According to one embodiment, a spring device is provided, wherein the diameter of the internal cavity is in the range of 5% to 95%, preferably 10% to 90%, for example 20% to 80% of the diameter of the elongated elastic element.

A sufficiently large wall thickness of the elastic element is advantageous as it allows to maintain the resilient action even in the compressed state of the internal cavity. This also ensures that the spring device is robust since, even in the event of a loss of pressure of the gas, the resilient action can be guaranteed. A sufficiently large internal cavity allows sufficient flexibility to vary the spring constant and/or angle of the spring device by varying the pressure in the gas in the internal cavity.

According to one embodiment, a spring device is provided, wherein the length of the elastic torsion device is in the range of 20% or more of the width of the vehicle.

This allows to realize a compact spring device that can nevertheless absorb a large load.

According to one embodiment, a spring device is provided, wherein the spring constant and/or the angular position of the elastic torsion device can be changed by changing the pressure of a gas in the internal cavities of the elongated elastic elements.

This allows to realize a flexible and adaptive spring device in a simple manner.

According to one embodiment, a spring device is provided, wherein the elongated elastic element comprises an elastic compressed air hose.

This allows to realize the spring device with the aid of simple and robust means.

According to one embodiment, a spring device is provided, wherein the elongated elastic element comprises a coupling and/or nipple for supplying gas from a suitable source of pressurized gas and/or changing and/or maintaining the pressure in a gas in the internal cavity.

Thus the setting of the spring can be determined by simple means. A simple compressed air pump, or a system similar to a system for automatically changing the tyre pressure, will suffice.

According to one embodiment, a spring device is provided, the spring device furthermore comprising a compressed air circuit and a suitable controller for adjusting the pressure in the gas in the internal cavity:

at a predetermined pressure; and/or in function of reaching a desired angular position of the torsion device;

in function of reaching a desired spring constant of the torsion device.

This allows flexible use of the spring device. A similar spring device can be used for simple systems wherein the pressure is manually adjusted if necessary, as well as for systems where frequent and/or automatic adjustment of the pressure based on a suitable control is desired, for example based on manual input from a user or depending on the value of certain sensors.

According to a second aspect, a resilient single-acting actuator is provided comprising a spring device according to the first aspect, characterized by the single-acting actuator being configured to be actuated by changing the pressure in a gas in the internal cavity of the elongated elastic elements, so that by increasing the pressure in the gas a rotation of the internal profile relative to the external profile about the central longitudinal axis can be realized according to a determined direction of rotation.

According to a third aspect, a resilient double-acting actuator is provided comprising two spring devices coupled together according to the first aspect, characterized by both spring devices being configured to realize a rotation about the central longitudinal axis of the internal profile with respect to the external profile of at least one of the spring devices, wherein upon increasing the pressure in a gas in the internal cavity of the elongated elements of the first spring device, a rotation about the central longitudinal axis according to a first direction of rotation is realized and upon increasing the pressure in a gas in the internal cavity of the elongated elements of the second spring device a rotation about the central longitudinal axis is realized in a second direction of rotation which is opposite to the first direction of rotation.

According to one embodiment, a resilient double-acting actuator is provided, wherein the two spring devices are radially coupled so that the internal profile of the first spring device coincides and/or is radially coupled to the external profile of the second spring device for rotation about a common longitudinal axis according to the central longitudinal axis.

According to one embodiment, a resilient double-acting actuator is provided, wherein the two spring devices coincide with their internal profile and/or are axially coupled for rotation about a common longitudinal axis along the central longitudinal axis.

According to a fourth aspect, an assembly is provided comprising two or more spring devices according to the first aspect, the assembly comprising two or more torsion devices 102; and furthermore comprising a compressed air circuit for coupling the gas supply of two or more torsion devices; and/or wherein the compressed air circuit (400) is configured for directing the compressed air in function of distributing the load between the two or more torsion devices (102).

This allows to optimally distribute the load over a plurality of spring devices in a simple manner.

According to a fifth aspect, a wheel suspension is provided for a vehicle comprising a spring device according to the first aspect and/or a resilient actuator according to the second and/or third aspect, wherein:

the wheel suspension comprises a wheel arm having a wheel axle for mounting a wheel; and the torsion device is configured to mount the wheel arm rotatably about the longitudinal axis to a frame of a vehicle by applying the internal profile to the wheel arm and the external profile to the frame of the vehicle or vice versa.

According to a sixth aspect, a vehicle is provided comprising one or more wheel suspensions according to the third aspect, wherein the one or more wheel suspensions are mounted to the frame of the vehicle.

According to a preferred embodiment, the vehicle comprises a plurality of wheel suspensions arranged one after the other in the direction of travel.

According to one embodiment, a vehicle is provided, the vehicle also comprising a compressed air circuit coupled to the wheel suspensions for determining the pressure of a gas in the internal cavities of the elongated elements of the torsion devices of the wheel suspensions.

It is understood that, "determining" means to direct, control, set, modify, etc.

According to one embodiment, a vehicle is provided, the vehicle also comprising a controller coupled to the compressed air circuit configured to alter the distance between the ground plane and the frame of the vehicle by altering the pressure of a gas in the interior cavities of the elongated elements of the torsion devices of the wheel suspensions through by the compressed air circuit:

determining the distance between the ground plane and the frame of the vehicle; and/or determining the distance between the base and the wheel axle and/or the distance between the wheel axle and the frame of the vehicle.

According to one embodiment, a vehicle is provided, wherein the vehicle comprises at least one lift axle having an actuator coupled to the wheel arm, which is enabled in a driving mode and directed in a lifting mode for determining the distance between the ground plane and the wheel axle and/or the distance between the wheel axle and the frame of the vehicle.

According to one embodiment, a vehicle is provided, wherein the lift axle comprises a resilient double-acting actuator according to the third aspect of the invention, wherein one of the two spring devices functions as an actuator of the lift axle.

According to one embodiment, a vehicle is provided, the vehicle comprising one or more of the following vehicles:

a land vehicle;
a road vehicle;
an off-road vehicle;
rail vehicle;
aeroplane;
a trailer;
a carriage;
a truck;

6 a tow tractor;
a tractor;
a car;
a motorcycle;
a trike;
a quad.

SHORT FIGURE DESCRIPTION

In order to better demonstrate the features, structures or characteristics of the present invention, some embodiments of the present invention are shown in the accompanying figures without any limitation. The following description of these accompanying figures is illustrative in nature only and is not intended to limit the subject matter, its application and/or use. The numbering used in the accompanying figures serves to more easily identify certain elements without limiting the illustrated elements and/or embodiments of the present invention thereto.

Some exemplary embodiments are described in more detail below with reference to the following figures:

FIGS. 1 to 3 schematically show a cross-section of an embodiment of a spring device according to the line I-I in FIG. 4 in different states;

FIG. 9 shows an embodiment of a vehicle using an embodiment of a spring device similar to FIGS. 1 to 8; and FIGS. 10 and 11 show an alternative embodiment of a spring device in different states;

Figure 1:
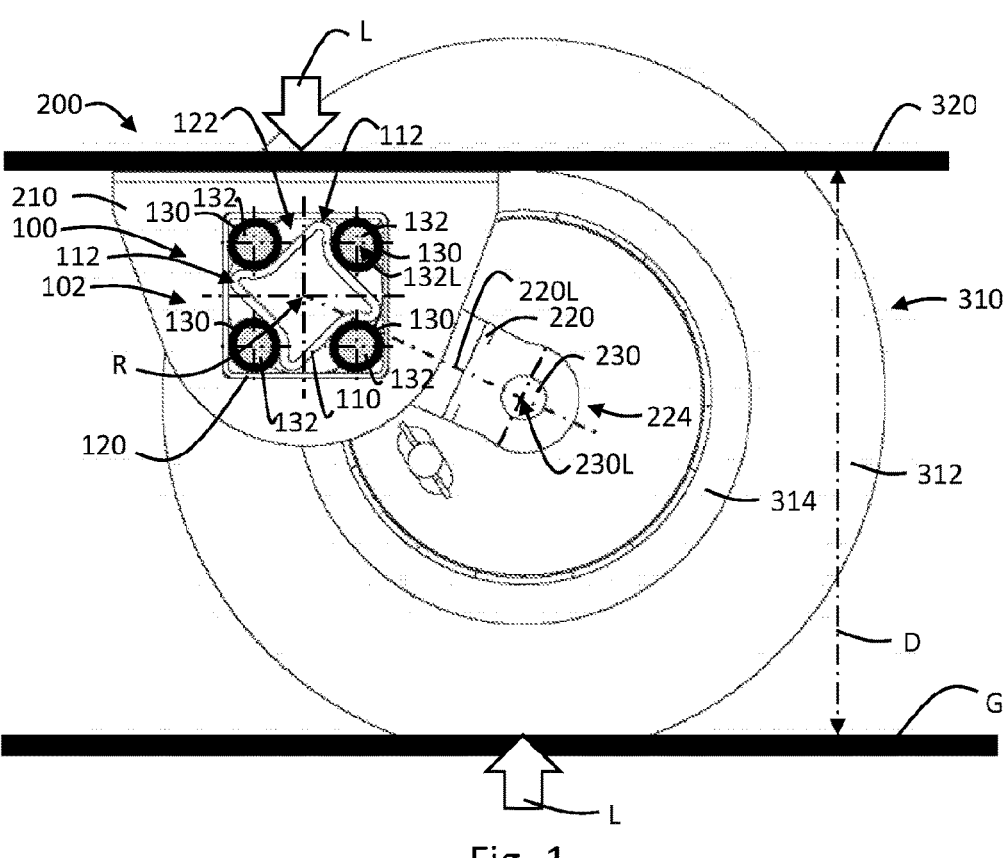
Figure 2:
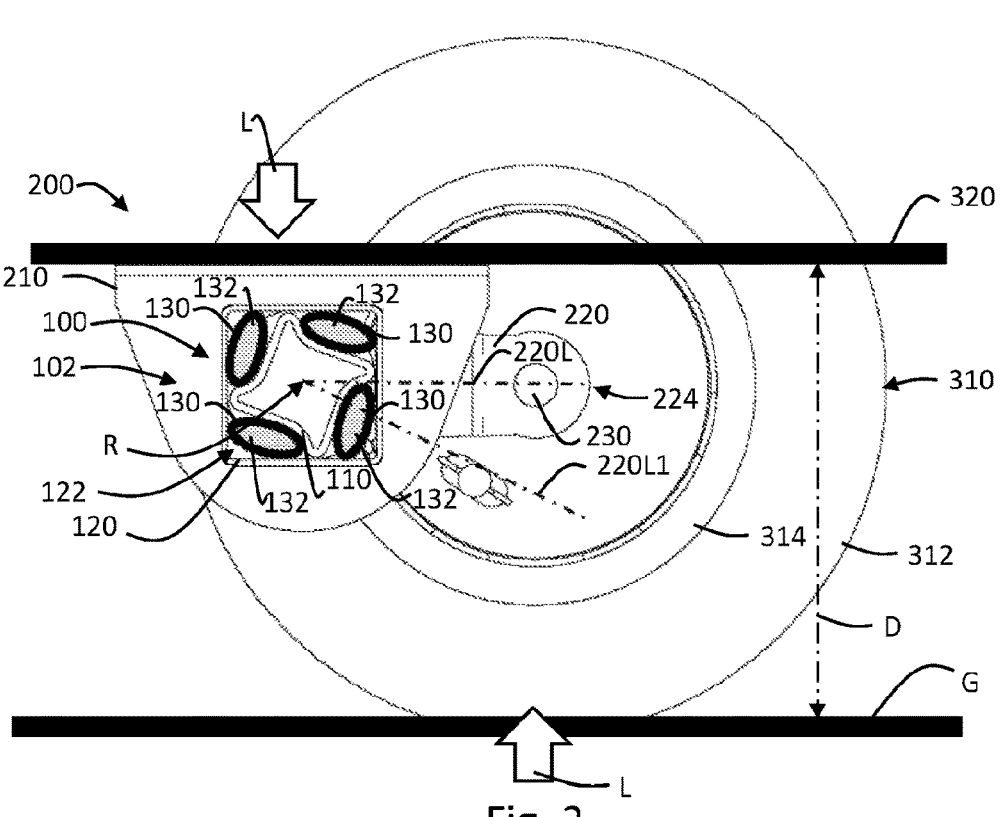
Figure 14:
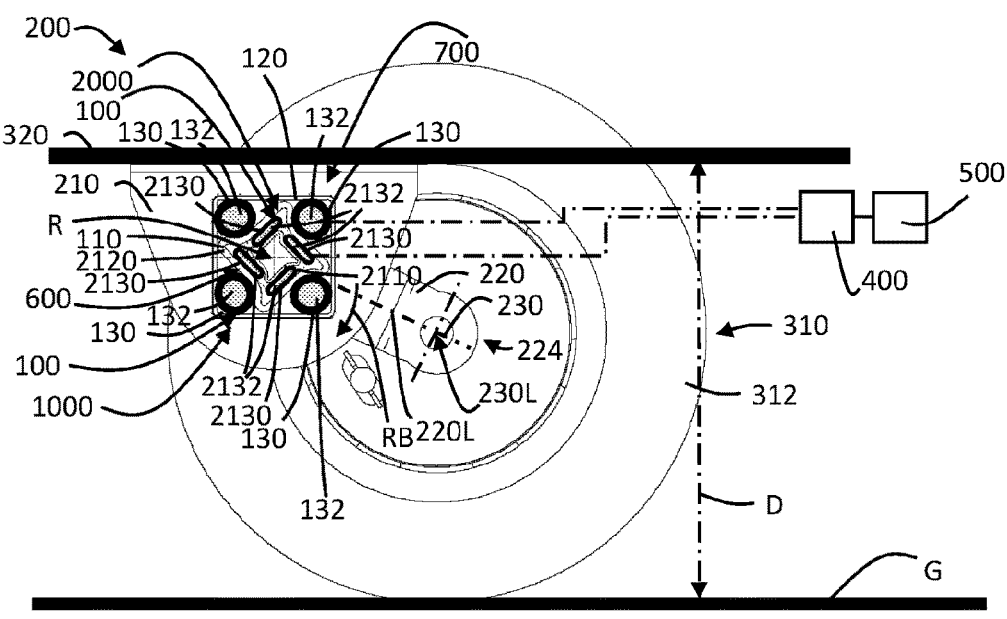
Figure 15:
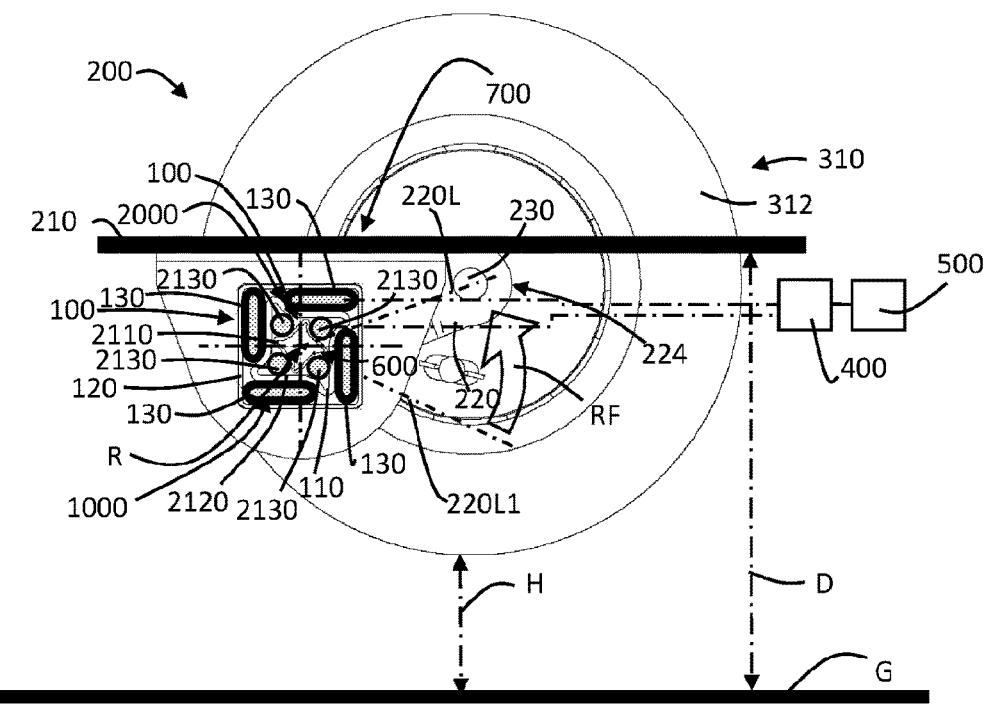
Figure 16:
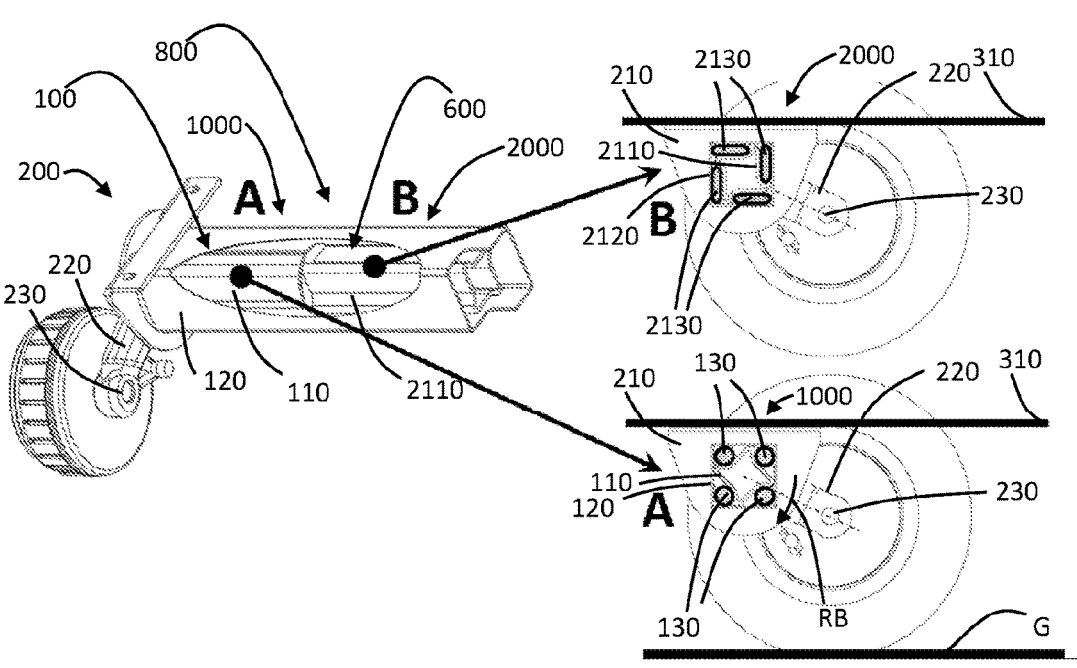
Figure 17:
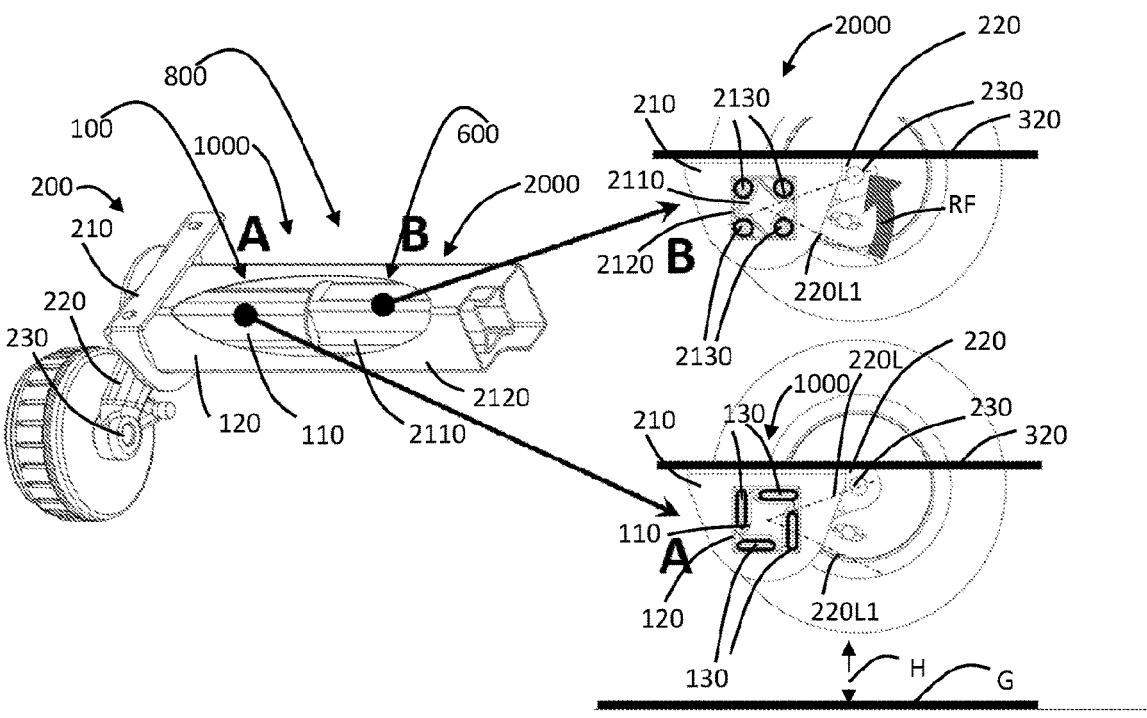
Figure 21:
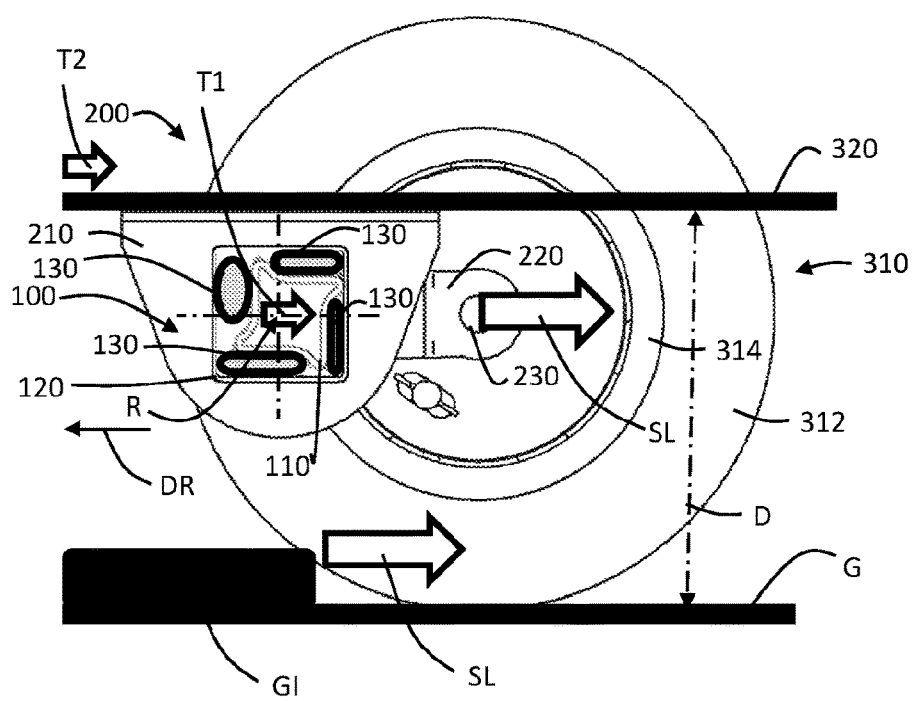
Figure 22:
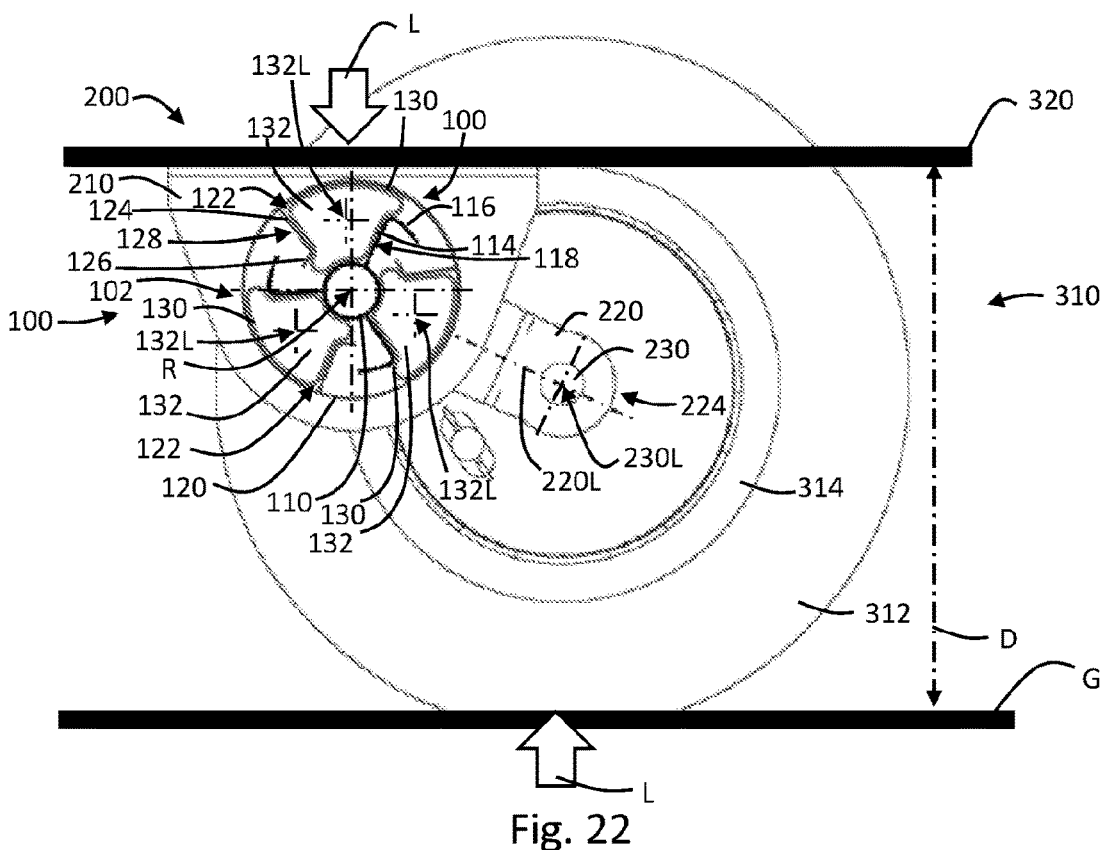
Figures 23, 24:
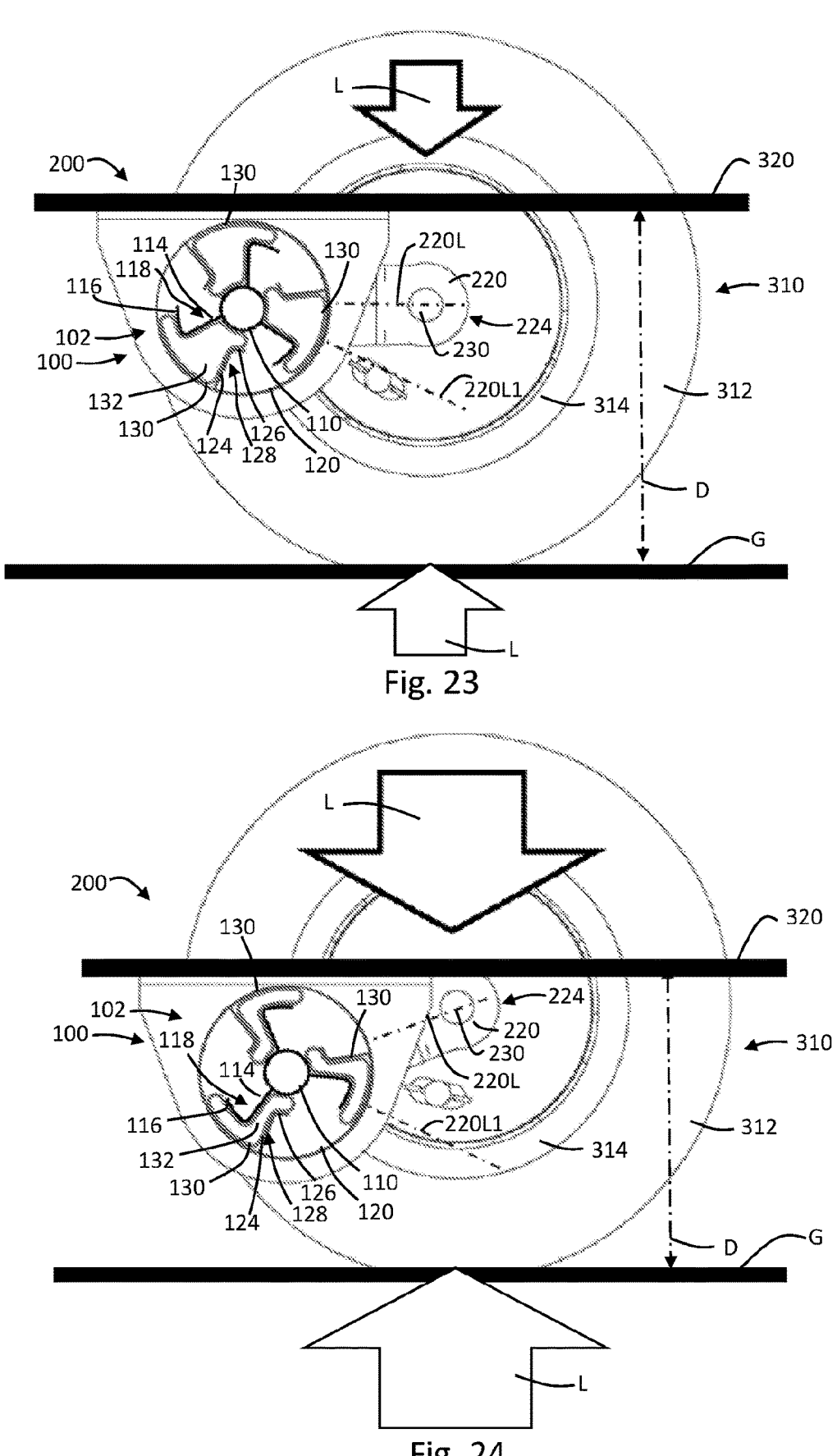
Figure 25:
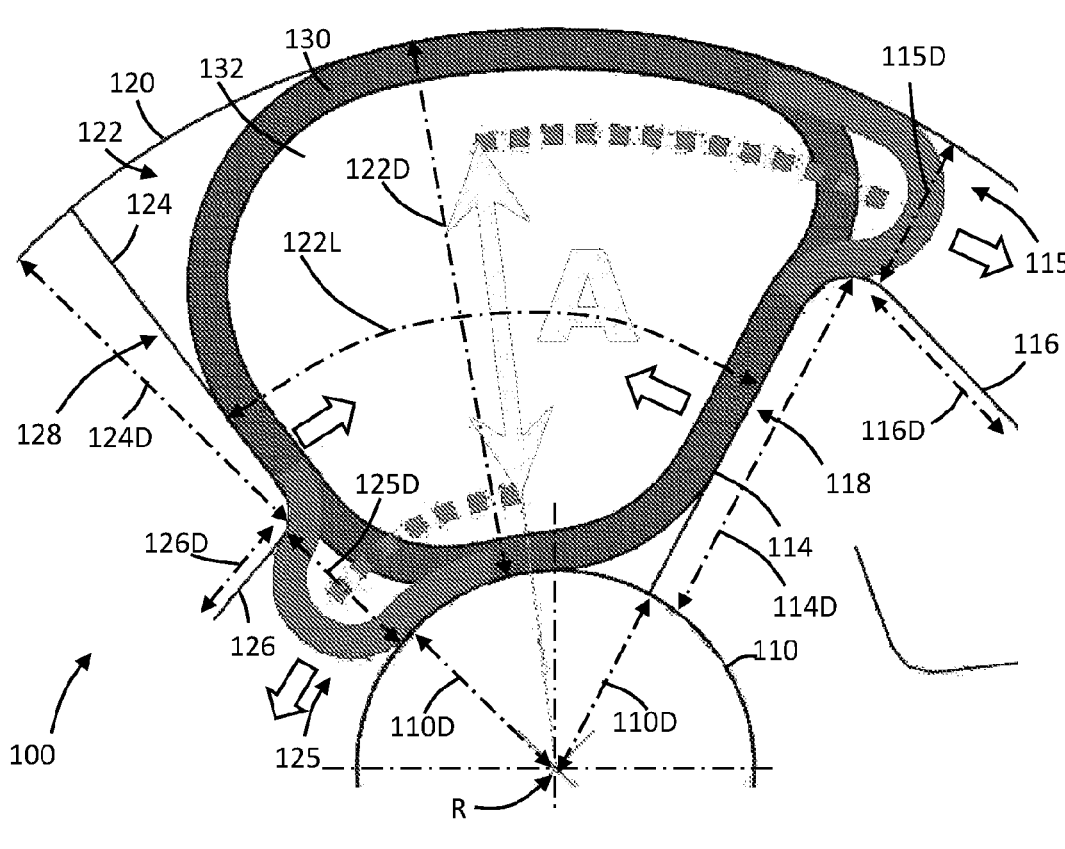
Figure 26:
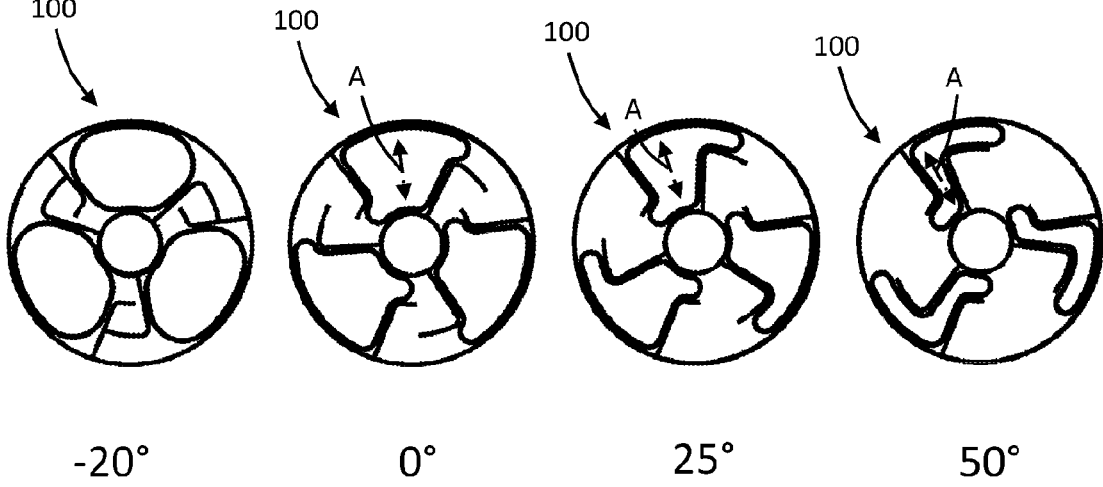
Figure 27:
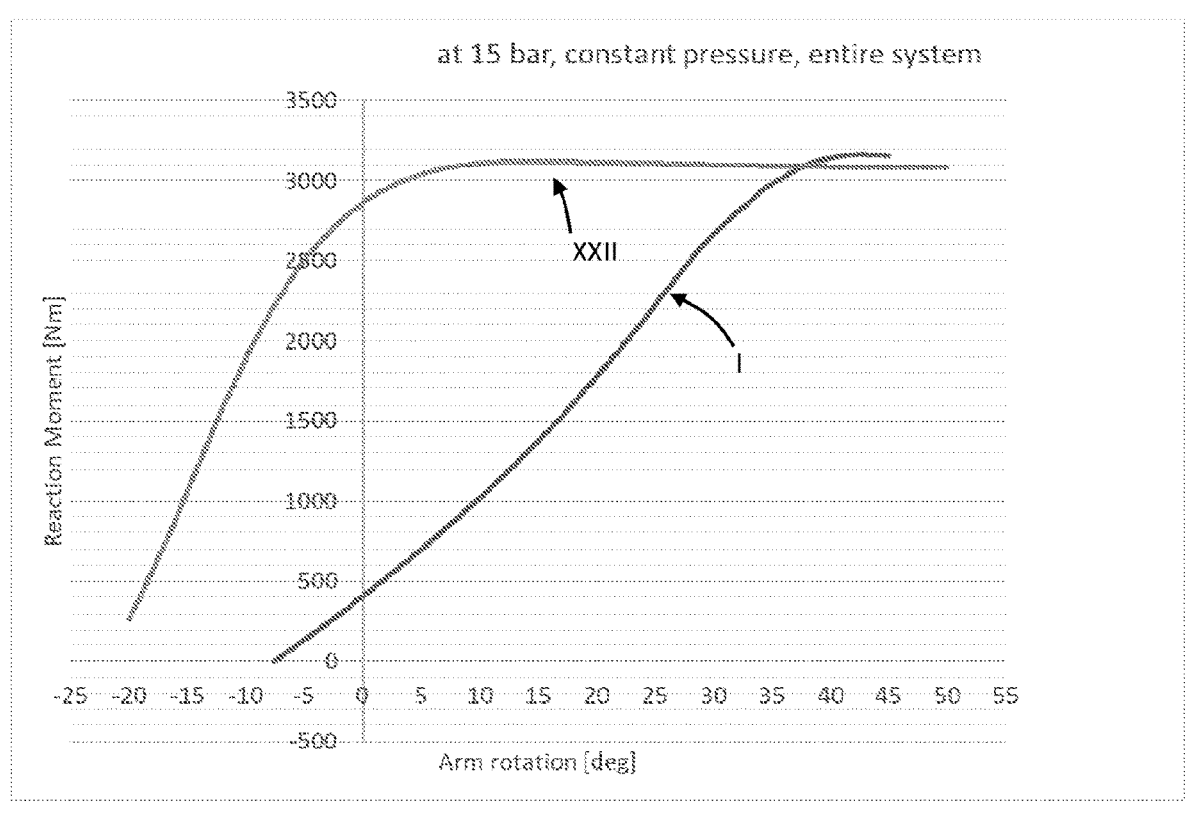
Figure 28:
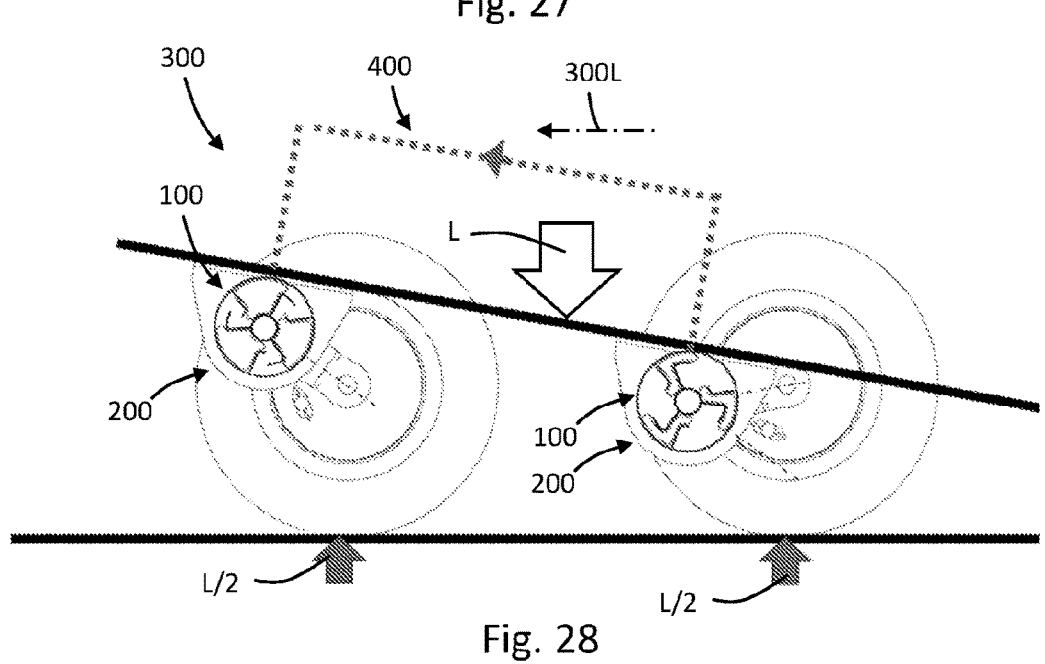

FIGS. 14 and 15 also show an alternative embodiment of a spring device and a lift actuator, as well as an embodiment of a double-acting actuator in a driving mode and a lift mode;

FIGS. 16 and 17 and their respective sections in details A and B also show an alternative embodiment of a spring device and a lift actuator, as well as an alternative embodiment of a double-acting actuator in a driving mode and lift mode;

FIG. 18 schematically shows a perspective view and FIGS. 19 and 20 a side view in driving mode and lifting mode of an alternative embodiment of a spring device;

FIG. 21 shows a similar embodiment and view to FIG. 2 with an alternative load;

FIGS. 22 to 24 show an alternative embodiment of the spring device, as well as associated wheel suspensions for a vehicle;

FIG. 25 schematically shows a detail of the operation after the embodiment of the spring device of FIG. 22;

FIG. 26 shows the embodiment of the spring device of FIG. 22 in different angular positions;

FIG. 27 shows the evolution of the reaction moment with respect to the angular displacement of an embodiment of a wheel suspension with a spring device 100 as shown in FIG. 22 and the embodiment shown in FIG. 1;

FIG. 28 shows an embodiment of a vehicle with two wheel suspensions arranged one after the other and comprising an embodiment of the spring device according to FIG. 22;

FIG. 29 shows the evolution of the cross-sectional area of the elastic elements with respect to the angular displacement of an embodiment of a wheel suspension with a spring device 100 as shown in FIG. 22 and the embodiment shown in FIG. 1;

FIG. 30 shows an embodiment of a vehicle with two wheel suspensions arranged one after the other and comprising an embodiment of the spring device according to FIG. 22;

FIG. 31 shows, in comparison with FIG. 30, a similar embodiment of a vehicle as FIG. 30 with prior art spring devices.

Figure 32:
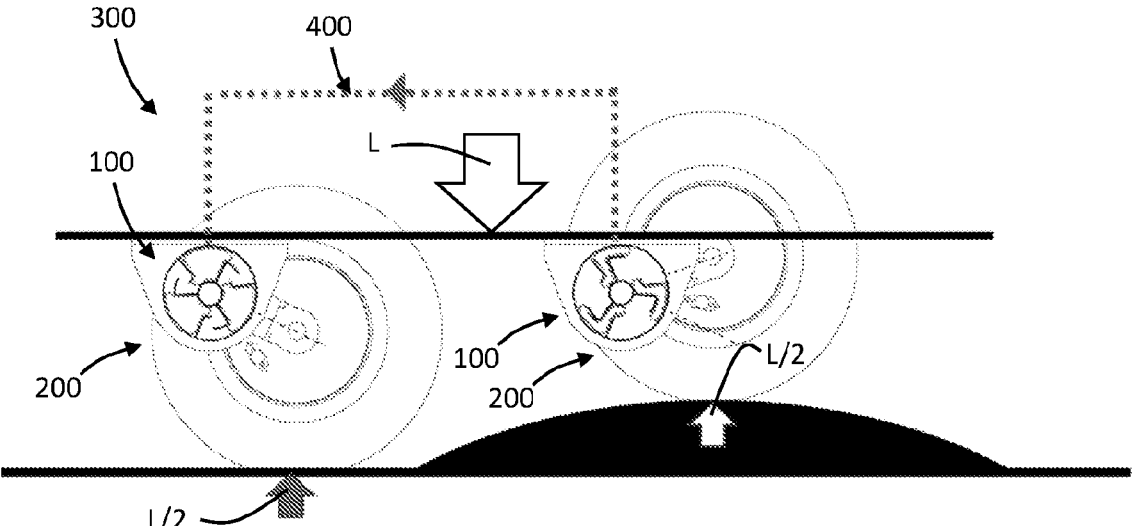

FIG. 32 shows an embodiment of the spring device 100 similar to FIG. 28 when wheel suspensions 200 of a vehicle 300 are arranged in succession and are brought into a different angular position, for example in response to an irregularity in the ground surface.

DETAILED DESCRIPTION

Before describing the aspects and embodiments of the present invention, it is to be understood that this invention is not limited to specific systems, methods and/or combinations as described herein, as such aspects and embodiments may, of course, vary. It is also to be understood that specific aspects and embodiments described herein are not intended to be limiting, as the scope of the present invention is limited only by the appended claims. Reference characters in the present specification and in the appended claims are also not to be construed as limiting the scope of the present invention.

The terms "contain, "containing", "contains", "comprise", "comprising", "comprises" as further used are synonymous with "including", "include", "inclusive of", or "contain," containing", "contains", and are inclusive or open-ended, and do not exclude additional, unnamed elements, elements, components and/or method steps. When referring to specific elements, elements, components and/or method steps in specific embodiments of the present invention, the possible presence of other elements, elements, components and/or method steps is not excluded.

The singular forms "a" and "the" include both the singular and the plural, unless clearly indicated to the contrary.

Consecutive terms such as "first", "second", "third", etc. are used in this description and in the appended claims to distinguish between comparable elements and not necessarily to describe a sequential or chronological order, unless the contrary is clearly stated. It is understood that these terms are interchangeable under appropriate circumstances and that the embodiments of the invention described in this application are capable of operating in different orders than described or illustrated in this application.

The term "approximately" is used in the present specification and in the appended claims to provide flexibility to a numerical range by stipulating that a given value may be "a little above" or "a little below" a stated value or numerical range. For example, when referring to a measurable value such as a parameter, an amount, a duration, etc., it is intended to incorporate variations of +/−10% or less, preferably +/−5% or less, more preferably +/−1% or less, and more preferably +/−0.1% or less, of and from the specified value, so far as the variations are appropriate to function in the invention described herein. It should be understood that the value to which the term "approximately" refers has also been disclosed per se. The listing and/or enumeration of numerical values by a range of numbers includes all numbers and fractions comprised within the associated ranges, as well as the endpoints listed.

The terms "substantially", "essentially" or "practically" refer to the full or nearly complete extent or degree of an action, characteristic, property, state, structure, object and/or result. For example, an object that is "essentially" enclosed means that the object is completely or almost completely enclosed. For example, an object that is "practically" perpendicular means that the object is completely or almost completely perpendicular to a reference plane. The exact allowable degree of deviation from absolute completeness may in some cases depend on the specific context. In general, however, the degree of completion will be such that the overall result is the same as absolute and total completion. The use of "essentially" equally applies when used in a negative connotation to refer to the complete or almost complete lack of an action, characteristic, property, state, structure, object, or result. For example, a composition that is "substantially free" of particles would be either completely free of particles or almost completely free of particles that the effect would be the same as if the composition were completely free of particles. In other words, a composition that is "substantially free of" an ingredient or element may still comprise such an ingredient or element if there is no measurable effect thereof.

Relative terms such as "left", "right", "in front of", "behind", "above", "under", etc. are used in this description and in the appended claims for descriptive purposes and not necessarily to describe permanent positions or orientations, depending on the context in which these terms are used. It is understood that the terms used are interchangeable under appropriate circumstances, so that, for example, the embodiments described herein may also be used in positions or orientations other than those shown or described.

The terms "adjacent to", "next to" or "against" each other are used in the present specification and in the appended claims for descriptive purposes and not necessarily for the description of permanent positions, depending on the context in which those terms are used. For example, objects described as "adjacent to" each other may be in physical contact with each other, in close proximity, or in the same general region or area, depending on the context in which the term is used.

In the following passages, various aspects of the invention are further defined. Any aspect so defined may be combined with any other aspect or aspects unless clearly stated to the contrary. In particular, a feature referred to as the "preferred" or "advantageous" may be combined with other features or attributes designated as "preferred" and/or "advantageous". Reference in this specification to "one embodiment" or "an embodiment" means that a particular function, structure or characteristic described in connection with the embodiment is applicable in at least one embodiment of the present invention. When the phrases "in one embodiment" or "an embodiment" are mentioned in different places in this specification, they do not necessarily refer to the same embodiment, although this is not excluded. Furthermore, the disclosed features, structures or characteristics may be combined in any suitable manner, as will be understood to one skilled in the art from this disclosure. The embodiments described and claimed in the appended claims can be used in any combination.

In the present description, reference is made to the accompanying drawings which form a part thereof and which illustrate specific embodiments of the invention. Numbers in parentheses or in bold linked to certain elements illustrate the relevant elements by way of example, without limiting the elements. It should be understood that other embodiments may be used and structural or logical changes may be made without departing from the scope of the present invention. The following detailed description is not to be construed as limiting, and the scope of the present invention is defined by the appended claims.

Unless otherwise defined, all terms as used in the present specification and in the appended claims, including technical and scientific terms, have the meaning as commonly understood by one skilled in the art. As a further guide, definitions are included for further explanation of terms used in the description of the invention. All documents cited in the present specification are hereby incorporated by reference in their entirety.

FIG. 1 shows a first state of an embodiment of a wheel suspension 200 for a vehicle 300. Such vehicles 300 can be self-propelled land vehicles, such as, for example, wagons, cars, trucks, agricultural vehicles, construction vehicles, etc., or towed or hauled land vehicles, such as for example trailers, carts, wagons, etc., or any other suitable land vehicle. As discussed below in more detail, such vehicles 300 may include one or more of such wheel suspensions 200 for attaching one or more of the wheels 310 of the vehicle 300 to the frame 320 of the vehicle 300.

According to the exemplary embodiment shown in FIG. 1, the wheel suspension 200 comprises a mounting bracket 210 with which the wheel suspension 200 is fixed to the frame 320 of the vehicle 300. The spring device 100 is then attached to this mounting bracket 210, to which an end 222 of a tilting arm 220 is mounted for rotation about a central longitudinal axis R of the spring device 100. It is thereby understood that the central longitudinal axis R functions as an axis of rotation. As can be seen, such a tilting arm 220 is an elongated element having a longitudinal axis 220L extending substantially transversely to the central longitudinal axis R of the spring device 100. At the opposite end 224 of the tilting arm 220 a wheel axle 230 is provided, having a longitudinal axis 230L that extends transversely with respect to the longitudinal axis 220L of this tilting arm 220, as shown, and/or substantially parallel to the central longitudinal axis R of the spring device 100, and/or substantially parallel to the ground surface G. To said wheel axle 230 wheel 310 is arranged for rotation about said longitudinal axis 230L of the wheel axle 230. According to the illustrated exemplary embodiment, a rotatable rim 314 of a bearing system, brake drum, . . . for example is arranged on the wheel axle 230, said rotatable rim 314 then being fitted with a suitable tyre 312, for example a pneumatic tyre or other suitable tyre, which makes contact with the ground surface G, for example a road surface or another suitable ground surface.

The wheel suspension 200 is shown in a first state where a certain load L on the frame 320, as shown schematically by the arrow in FIG. 1, is transferred by the wheel suspension 200 to the ground surface G. This load L is, for example, the force developed by the mass carried by the frame of the vehicle, or a load carried by the frame of the vehicle, . . . . It is understood that this load L, at the level of the contact point of the wheel with the ground surface, causes a similar reaction force in the opposite direction, as also schematically indicated by arrow L. It is also understood that this load L can originate from loads generated by unevenness or obstacles on the ground surface, which are absorbed by the wheel suspension as the vehicle moves over the ground surface.

As shown in FIG. 1, the spring device 100 includes an elongated elastic torsion device 102. It is thereby understood that such a torsion device 102 is configured to rotate about a central longitudinal axis R at a load L. This is realized according to the illustrated exemplary embodiment by an elongated internal profile 110 rotatable about the central longitudinal axis R. As can be seen, this elongated internal profile 110 is arranged in an elongated internal cavity 122 of an elongated external profile 120. Thereby the internal profile 110 is supported by four elongated elastic elements 130 which are arranged at different angular positions around the central longitudinal axis R between the internal profile 110 and the external profile 120. It will be understood to a person skilled in the art that such a type of torsion device 102, also referred to as a torsion spring, a rubber torsion spring, etc., can include numerous variant embodiments as to the shape of the internal and external profile, as well as the number of the elastic elements, typically also referred to as elastic strands applied to allow a resilient rotation about the central longitudinal axis R, typically between two extreme angular positions wherein the elastic elements are in an uncompressed and a fully compressed state, respectively, depending on the magnitude of the load that is applied to the spring device 100 via the wheel suspension 200. Although four elastic elements 130 are shown herein and profiles 110, 120 with a substantially square shape for their cross-section, it is to be understood that any other suitable number of elastic elements 130, for example three, five, six, or more is possible and that an alternative, associated suitable shape of the internal profile 110 such as having a triangular, pentagonal, hexagonal, etc. basic shape, or any other suitable polygonal or rounded shape that allows to insert the elongated elastic elements 130 distributed about the central longitudinal axis R between the internal profile 110 and the cavity 122 into the external profile 120.

The advantage of the elongated elastic elements 130, as shown, for example, with reference to FIG. 1 is that they comprise a gas-filled internal cavity 132. According to the exemplary embodiment shown, the gas is, for example, compressed air introduced into this internal cavity 132 under a predetermined pressure. It is understood that the internal cavity 132 is configured or closed by elements, such as a nipple, a valve, a coupling, which are configured to retain and/or control the amount of gas in the internal cavity 132. In other words, to determine the pressure in the gas in the internal cavity 132 so that a desired value can be set and/or maintained. It is understood that alternative embodiments are possible in which another suitable gas, such as, for example, nitrogen gas, helium, another suitable inert gas, any other suitable gas can be used. It is understood, however, that in still other alternative embodiments, the cavity 132 is filled with a gas that is not necessarily pressurized and/or at ambient pressure and/or is free to flow into or out of the internal cavity 132. For example, the elongated elastic elements 130 can be formed in a simple manner by means of a compressed air hose or any other suitable hose with an internal cavity such as for example an air chamber. According to one embodiment, this hose can comprise an internal cavity closed on both sides, or alternatively have an opening and/or a connection on at least one side, for instance for a connection to a suitable compressed air circuit.

According to the example shown, the pressure of the compressed air in the internal cavity 132 is, for example, in the range of 1 bar to 50 bar, for example in the range of 2 bar to 30 bar, for example in the range of 6 bar to with 14 bar. For example, the pressure was applied by means of a suitable compressed air source which was temporarily coupled to a suitable nipple providing access to the internal cavity 132 of the elongated elastic element 130. After removal of the compressed air source, the nipple functions so that no compressed air from the internal cavity 132 can escape, for example by means of a suitable check valve, shut-off valve, or the like.

As can be seen below in more detail in FIGS. 5 and 6, in this exemplary embodiment the internal profile 110 is fitted at one end to the wheel arm 220, as well as the external profile 120 is fitted via the mounting bracket 210 to the frame 320 of the vehicle 300. In other words, the torsion device 102 allows the internal profile 110, and thus also the wheel arm 220, to rotate about the longitudinal axis R with respect to the external profile 120 mounted on the frame 320. Or in other words, with a changing load L, the angular position of the longitudinal axis 220L of the wheel arm 220 about the longitudinal axis R of the torsion device 102 can change.

Furthermore it is understood that, according to the exemplary embodiment shown, the internal profile 110, the external profile 120, the cavity 122 of the elongated external profile 120 all include a central longitudinal axis along the central longitudinal axis R of the torsion device 102. It is furthermore also understood that the elongated elastic elements 130 also include a longitudinal axis 132L which is substantially parallel to the central longitudinal axis R.

FIG. 2 shows the same embodiment as in FIG. 1 in a different state. As shown schematically, in this state, similar to the state shown in FIG. 1, the same load L is applied to the wheel suspension 200. However, as shown, the pressure of the gas in the internal cavity 132 of the elongated elastic elements 130 was adjusted, for example from 14 bar in FIG. 1 to 10 bar in FIG. 2, in other words a pressure that is lower than in the state shown in FIG. 1. It is understood that by changing the pressure in this way the angular position of the longitudinal axis 220L can be changed with respect to the longitudinal axis L. For reference, the angular position from the state in FIG. 2 is shown by dash-dot line 220L1. However, it is understood that the evolution from the state in FIG. 1 to that shown in FIG. 2 can also be obtained by an increasing load L applied to the wheel suspension 200, whereby the pressure of the gas in the internal cavity 132 is not actively controlled and/or is not actively changed. In other words, in this scenario where the load L changes, and where, for example, according to an exemplary embodiment, the amount of gas comprised in the internal cavities 132 is kept constant, the pressure in the gas in the internal cavities 132 may change under the influence of the change of the volume of the internal cavities 132, for example from 6 bar in FIG. 1, to a 10 bar in FIG. 2 and to 14 bar in FIG. 3, however this is not accomplished by actively controlling the pressure in the internal cavities 132. However, it is understood that alternative embodiments are possible in which any suitable compressed air circuit is connected to the internal cavities 132 configured to control the pressure in the internal cavities 132 in a desired manner. For example, this compressed air circuit can be configured to regulate the pressure in the internal cavities 132 to a desired predetermined value even with a changing load, for example by means of a suitable pressure regulator. However, it is understood that alternative embodiments are possible of such a compressed air circuit as described below in more detail.

Figures 3, 4:
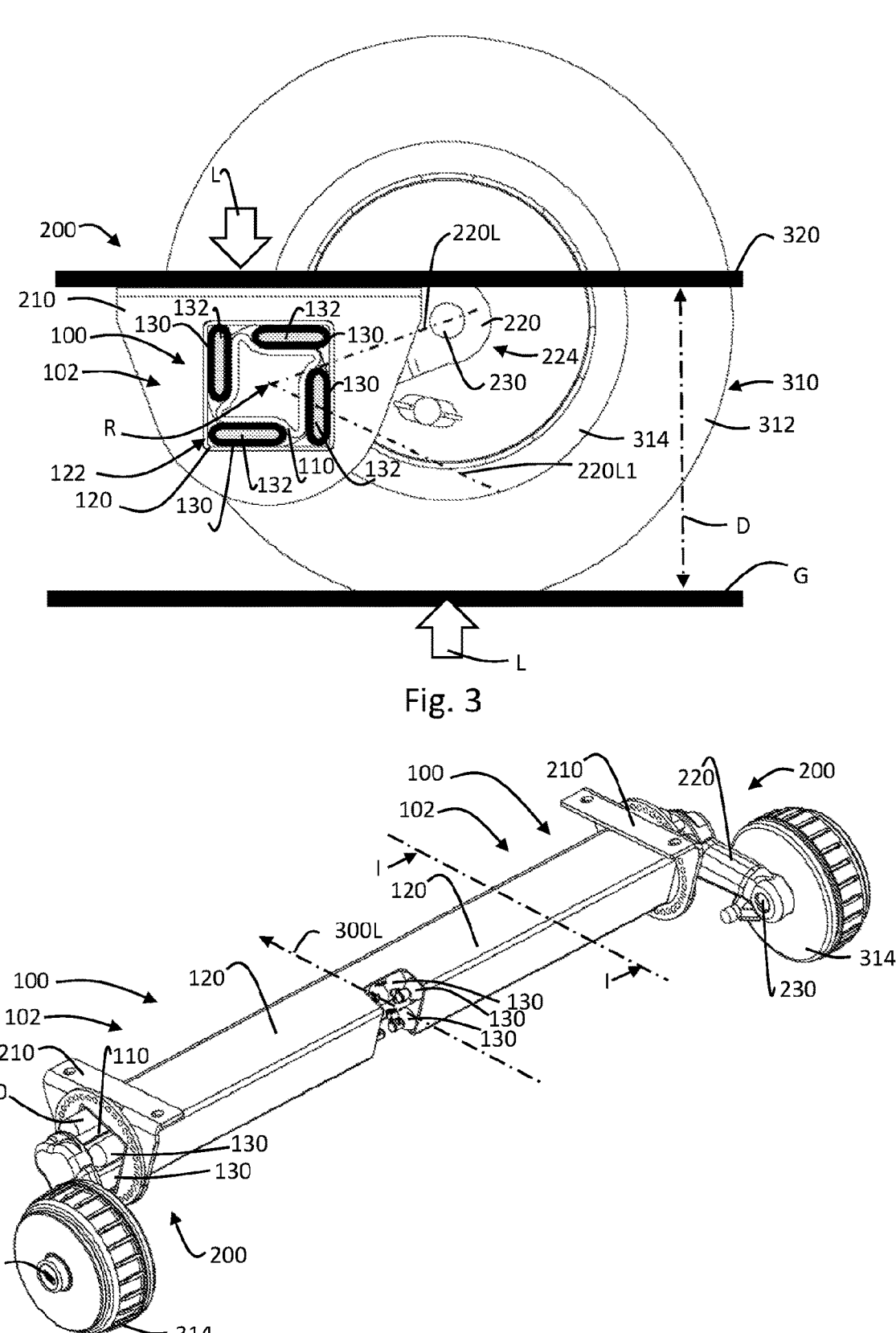
FIG. 4 shows schematically a perspective view of the embodiment of FIGS. 1 to 3.

Similarly, in FIG. 3, the pressure of the gas in the internal cavity 132 was reduced even further, for example to a pressure of 6 bar, in other words a pressure even lower than the state in FIG. 2. It is understood that the angular position of the longitudinal axis 220L is thereby changed even further in the same direction with respect to the angular position 220L1 in FIG. 1. It is thereby advantageous that even in the situation shown in FIG. 3, in which the internal cavity 132 is almost completely compressed, the resilient effect of the torsion device 1012 is permanently fulfilled by the elastic material of the wall of the elongated elastic element 130.

Therefore it is understood that in this way by adjusting pressure in the internal cavity 132 of the elongated elastic elements 130, under the same load, the angular position of the longitudinal axis 220 of the wheel arm 220 can be adjusted so that the distance D between the ground plane G and the frame 320 of the vehicle 300 is modified. This can be useful, for example when adjusting the ramp height of a vehicle cargo bed, when adjusting the clear height of the vehicle to paved and unpaved ground surfaces, etc.

Furthermore it is understood that adjusting the pressure of the gas in the internal cavity 132 of the elongated elements 130 can also be used to adjust the spring constant of the torsion device 102.

FIG. 4 shows a perspective view of an assembly comprising two wheel suspensions 200 according to the exemplary embodiment described above, for example for two wheels on either side of the vehicle 300, for example a left and a right wheel of an axle of a trailer. As can be seen, both wheel suspensions 200 are constructed similarly and almost mirror-symmetrically with respect to a central longitudinal axis 300L of the vehicle 300. FIG. 5 shows the wheel suspension of the left wheel from FIG. 4 in more detail and FIG. 6 the wheel suspension 200 of the right wheel from FIG. 4 in more detail.

Figure 7:
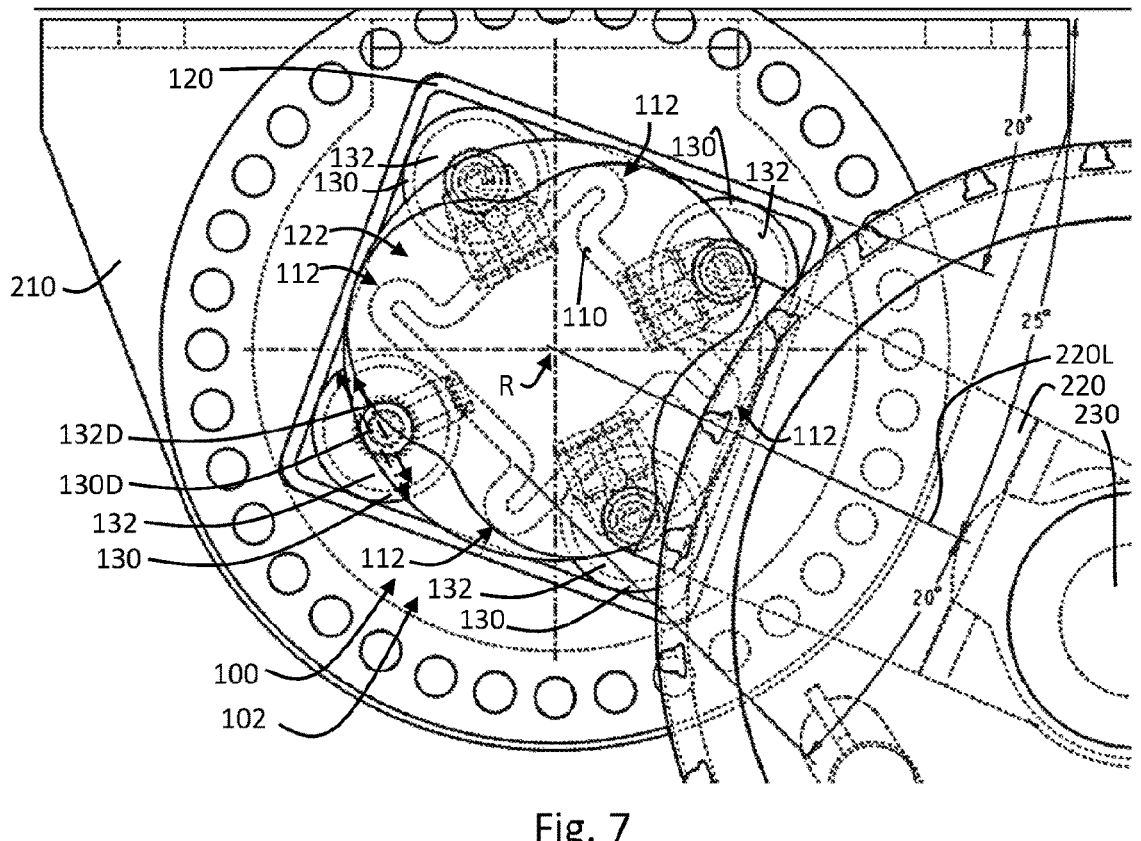
FIG. 7 shows a side view of an alternative embodiment, similar to FIGS. 1 to 6.

FIG. 7 shows an alternative embodiment of the torsion device 200, similar to the embodiment described above in more detail. This embodiment is drawn to scale and shows a number of angles at which the various elements are arranged relative to the frame of the vehicle. However, it is understood that alternative values are possible. As can be seen, the cross-sectional shape of the internal profile 110 deviates slightly from the shape of the preceding Figures, however, similar to that seen in these Figures, this shape which as a base is a square near each of the corners includes an optional bulge extending in the direction of the external profile 120. Therefore this optional protrusion 112 extends only at the corners and for a part of a maximum of 50%, preferably a maximum of 20% of the length of the side of the square shape of the internal profile 110.

As can be seen in FIG. 7, the diameter 132D of the internal cavity 132 is relative to the diameter 130D of the elastic element 130 than in the embodiment of FIG. 1. It is understood that still further variant embodiments are possible, wherein the diameter 132D of the internal cavity 132 ranges from 5% to 95%, preferably 10% to 90%, for example 20% to 80% of the diameter 130D of the elongated elastic element 130.

Figure 5:
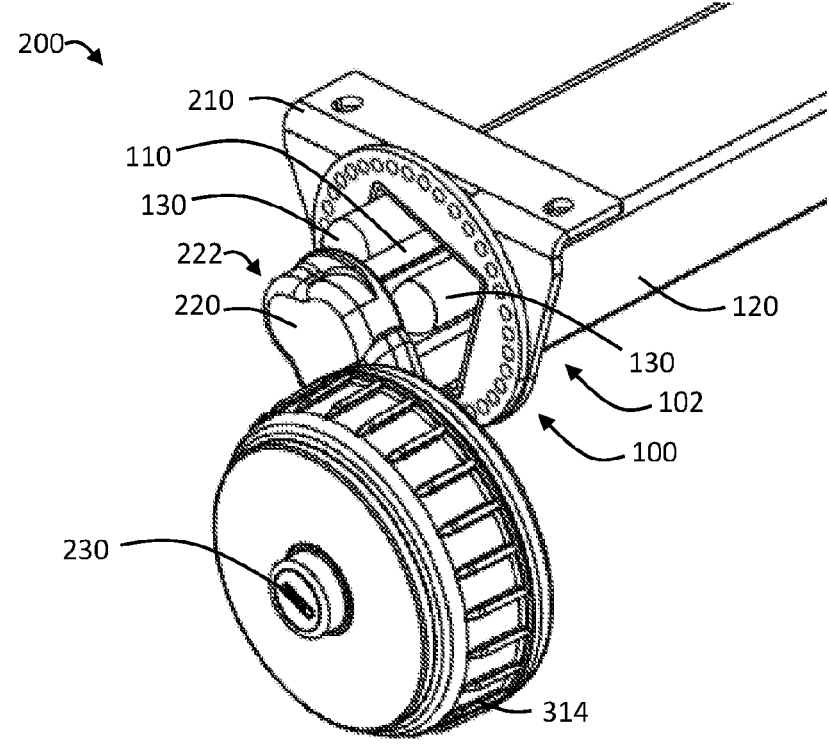
FIGS. 5 and 6 show, on an enlarged scale, details from FIG. 4.
Figure 6:
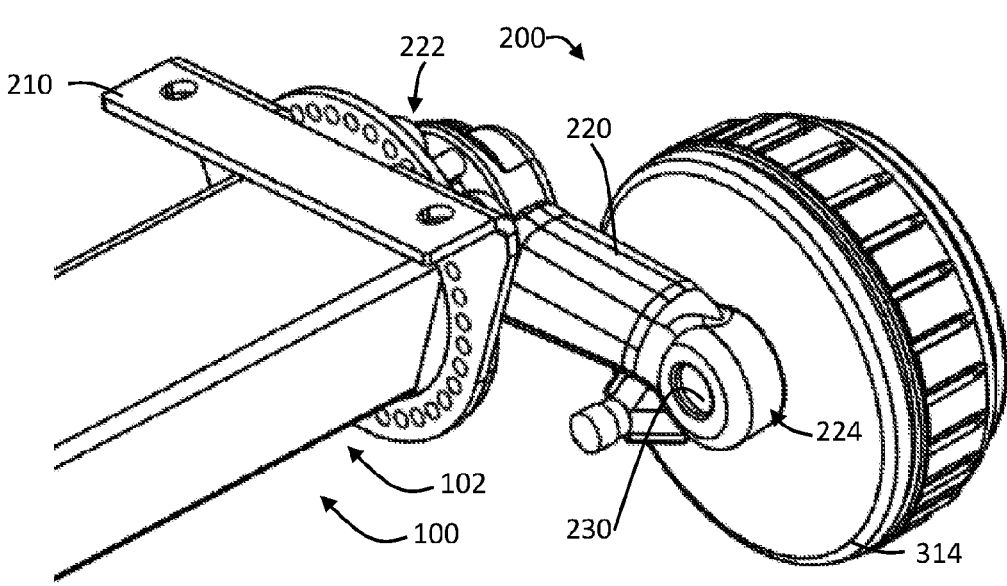
Figure 8:
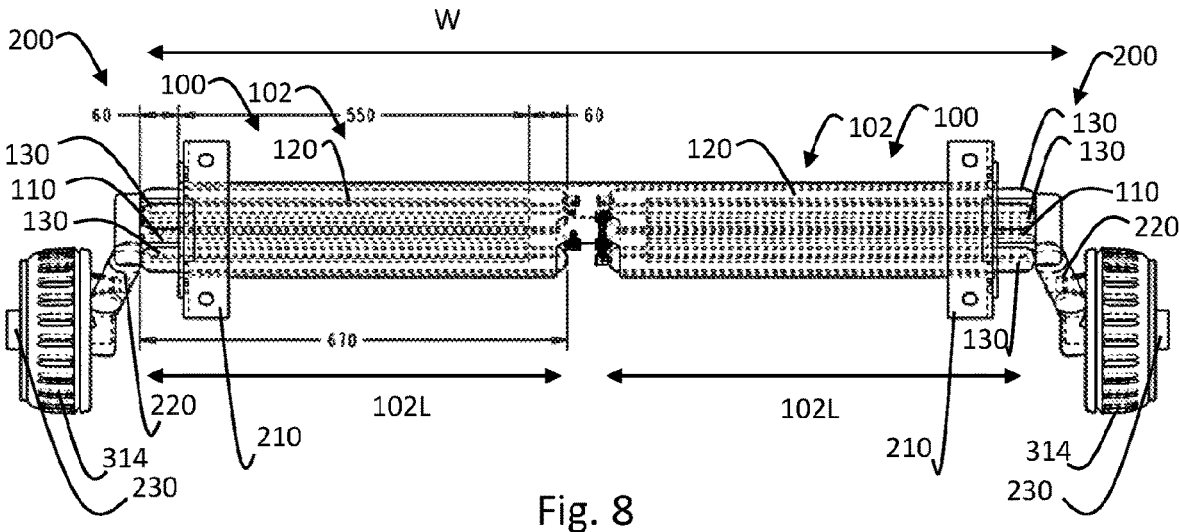
FIG. 8 shows a top view of an embodiment similar to FIG. 7.

FIG. 8 shows an embodiment of an assembly similar to FIGS. 4 to 6 to scale, wherein it is understood that the length 102L of both torsion devices 102 corresponds substantially to half the width W of the assembly, and typically also the vehicle 300. It is understood that alternative embodiments are possible in which the length 102L of the torsion devices has a different ratio to the width of the vehicle, but preferably they extend over 10% or more, preferably 20% or more, for example, 30% or more of the width of the vehicle 300. As can be seen, according to the illustrated exemplary embodiment, the length of the elastic elements 130 and their internal cavities 132 corresponds substantially to the length 102L of the torsion device 102. However, here too it is understood that alternative embodiments are possible, wherein the length of the internal cavity 132 is preferably in the range of 50% or more of the the the length of the elongated elastic element 130. According to one embodiment, the width is for example in the range 0.2 m to 5 m, for example in the range 0.5 m to 3 m, for example in the range 1.5 m+/−50%.

It is understood that alternative embodiments are possible, for example it is possible that the elongated elements 130 of the example shown in FIG. 8 extend over substantially the entire width W of the assembly and so are common to both torsion devices 102, and so as it were, they form common elongated elements 130 for two separate wheel suspensions 200. It is understood that still further variant embodiments are possible in which, for example, unlike in the example from FIG. 8, the external profile 120 is completely separate for each wheel suspension, and consequently each spring device 100 and/or wheel suspension 200 does not comprise common elements with another spring device 100 and/or wheel suspension, or in other words that the internal and/or external profiles form separate axle halves. Furthermore it is understood that still further variant embodiments are possible, wherein any suitable combination of at least partly common and/or separate parts are possible, in particular with regard to the internal profile 110, the external profile 120 and the elongated elastic elements 130.

FIG. 9 shows an embodiment of a vehicle 300 in the form of a trailer 302 being hauled by a carriage 304. As can be seen, the trailer 302 comprises two axles, each with a wheel suspension 200 on either side as described above, or in other words four wheel suspensions, two on either side of each axle of the trailer. It is understood that, as described above, the wheel suspensions 200 are mounted on a suitable frame of the trailer 302. According to the exemplary embodiment shown, a compressed air circuit 400 was coupled to the wheel suspensions 200 for determining the pressure of the gas in the internal cavities 132 of the elongated elements 130 of the torsion devices 102 of the wheel suspensions 200. Thus, for example, as in the illustrated state, the pressure of the gas in the internal cavities 132 can be reduced to achieve the illustrated loading state whereby the trailer ramp height is reduced to reach the loading state shown where the ramp height for the trailer is reduced by reducing the distance between the frame of the trailer and the ground surface. After the trailer has been loaded or unloaded, the pressure in the gas can then for instance be increased again so that the trailer can then be transported in a transport state with a sufficiently large free height above the ground surface. As shown, the vehicle 300 according to this exemplary embodiment comprises a control 500 coupled to the compressed air circuit 400. It is understood that alternative embodiments and situations are possible in which the control 500 measures the distance between the ground plane G and the frame 320 of the vehicle 300 via the compressed air circuit 400 by altering the pressure of the gas in the internal cavities 132. It is understood that the compressed air circuit 400 for this purpose may comprise any suitable components such as valves, couplings, reservoirs, pumps, etc. that can be suitably controlled by the control 500.

According to an advantageous embodiment, as also shown in FIG. 9, the compressed air circuit 400 couples the gas supply from two or more torsion devices 102. This ensures that the load can be distributed evenly over these multiple torsion devices 102 in a suitable manner. According to a simple embodiment, this is even possible with a very simple compressed air circuit 400, which, for example, only provides a suitable compressed air conduit for coupling the torsion devices 102, and in which, for example, a control 500 is optional. It is understood that alternative embodiments are possible in which, for example, the weight distribution on the loading floor, the weight distribution on a trailer hitch of the vehicle, etc. can be adjusted by means of a suitable distribution of the air pressure over the different torsion devices 102 by means of the compressed air circuit.

According to a still further embodiment, wherein the compressed air circuit allows to control and/or measure the pressure of the various torsion devices 102 of the wheel suspensions 200, on the basis of these measurements the load and/or its distribution, and also determine, for example, the weight and/or the weight of the load. Preferably, in addition to a determination or measurement of the pressure, the angular position of the torsion devices 102 and/or the angular position of the wheel arm 220, for example by measuring by means of a suitable sensor, is also taken into account in order to be automatically controlled by the control to have the weight and/or the weight distribution determined in function of the pressures and/or the angular positions. In other words, preferably one or more pressure sensors and/or angle sensors are coupled to the controller 500 which is configured to determine the weight and/or weight distribution of the vehicle and/or the load based on those measurements. Use can for instance be made here of a predetermined search table or a suitable predetermined correlation between the measured values of the one or more pressure and/or angle sensors and the weight and/or the weight distribution of the vehicle and/or the load. According to an exemplary embodiment, the angle sensor can for instance directly measure the angular displacement of the internal profile 110 with respect to the external profile 120 or, for instance, a part fixedly connected to the vehicle 300, such as for instance the mounting bracket 210, the frame 320, etc. According to a preferred embodiment, the angle sensor is arranged, for example, in the extension of internal profile 110. According to a preferred embodiment, for example in an embodiment similar to that shown in FIG. 4 or FIG. 8, the angle sensor can for instance be arranged at a position according to width W of the vehicle between the two spring devices 100 arranged in line for two wheel suspensions 200 on either side of a vehicle 300. It is understood that according to alternative embodiments one or more suitable sensors, such as for example suitable sensors for measuring an absolute and/or relative position and/or an angle and/or angular displacement and/or a distance and/or orientation can be used to control the compressed air circuit 400 of the spring device 100, for example by means of a suitable controller 500.

Finally, FIGS. 10 and 11 show a variant embodiment of a wheel suspension 200 in which similar elements are indicated with similar references and function in a similar way as described above. It is understood that, as shown, in this embodiment only three elongated elastic elements 130 with internal cavities 132 are provided and that the internal profile 110 and the external profile 120 have a rather triangular basic shape with the roundings in the form of protrusions and/or notches are provided for positioning the elastic elements 130 about the longitudinal axis R. FIG. 10 corresponds to an expanded state of the internal cavities similar to FIG. 1 and FIG. 11 corresponds to a compressed state of the internal cavities similar to FIG. 3.

Figure 12:
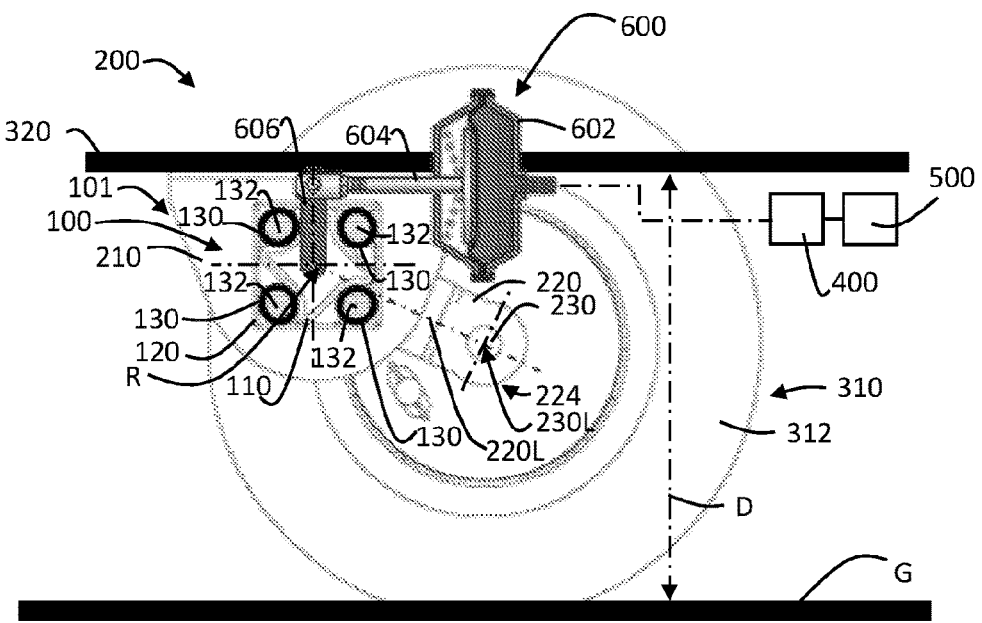
FIGS. 12 and 13 show an alternative embodiment of a spring device and a lift actuator in a driving mode and a lift mode.
Figure 13:
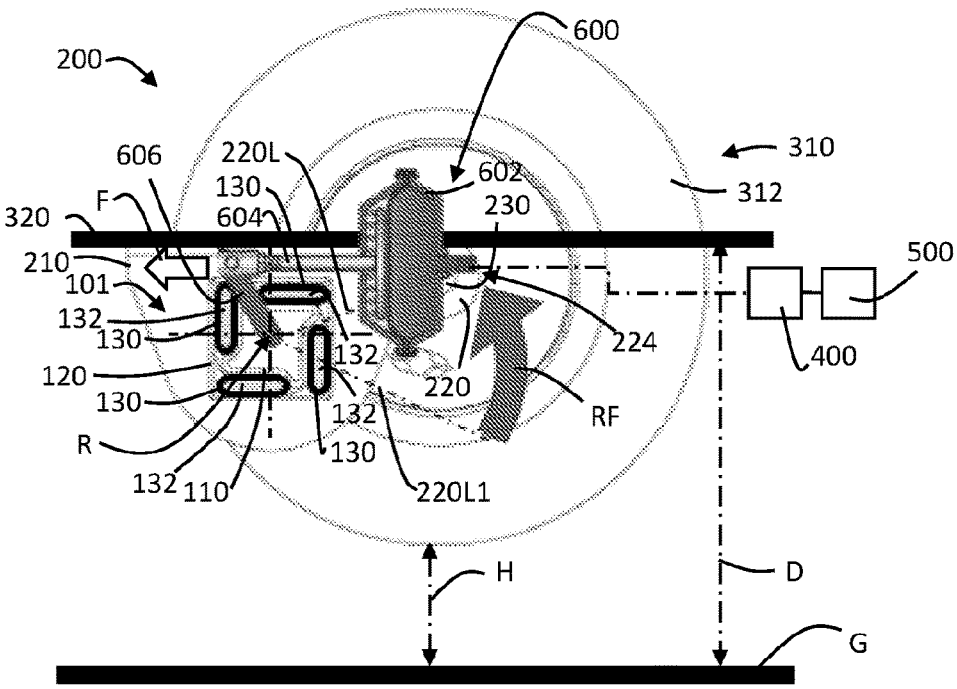

FIGS. 12 and 13 show another variant embodiment of a wheel suspension 200 in which similar elements are indicated by similar references and function in a similar manner as described above. According to this embodiment, the spring device 100 further includes a lift actuator 600. According to the illustrated embodiment, the lift actuator 600 is configured to be freely movable in a driving position as shown in FIG. 12, so that the spring device 100 can function as described above. However, in a raised position, as shown in FIG. 13, the lift actuator 600 is configured to cause the spring device 100 to rotate toward the frame 320. It is understood that, if the frame 320 is further supported by other wheel suspensions 200, the distance D between the frame 320 and the ground surface G can remain similar, as shown, in both states as shown in FIGS. 12 and 13. This ensures then that in this situation, as shown in FIG. 13, the distance between the base G and the wheel axle 230 and/or the distance between the wheel axle 230 and the frame 320 of the vehicle 300 can be determined so that the wheel can be lifted at a certain height H above the ground surface. Typically, when a vehicle includes such a lift axle, the lift actuator 600 coupled to the wheel arm is engaged in a drive mode. According to the illustrated lift actuator, which is, for example, a linear, pneumatic or hydraulic lift actuator 600, this can be achieved, for example, by reducing the pressure below a certain threshold value. According to the exemplary embodiment shown, the lift actuator 600 is coupled to the wheel arm 220 via the internal profile 110 of the spring device 100. Thus, according to the illustrated embodiment, the lift actuator includes a housing 602 mounted on the frame 320. This housing 602 cooperates with a movable plunger 604 which is coupled to the internal profile 110 by means of a suitable rod 604, so that a linear movement of the plunger 604 is converted into a rotational movement of the internal profile about the central longitudinal axis R. The spring device 100 functions similarly in the driving mode as described above. According to the illustrated exemplary embodiment, in the driving mode, the plunger 604 is free to move with any rotational movement of the internal profile 110, for example due to a changing load and/or a changing pressure in the gas in the internal cavities 132 of the elongated, elastic elements. In the lift mode, the lift actuator 600 is supplied with compressed air or hydraulic fluid under pressure and preferably the spring device 100 is released by reducing the pressure of the gas in the internal cavities 132 of the elongated elastic elements 130. Thus the plunger 604 of the lift actuator 600 will exert a force F as shown schematically by arrow F which will exert a torsion RF via the coupling rod 606 on the internal profile 110 coupled thereto around the central longitudinal axis R as shown schematically by arrow RF. If this torsion is greater than the resistance offered by the elongated elastic elements 130 of the spring device, then as shown in FIG. 13 the internal profile 110 will be rotated about the central longitudinal axis R so that the angular position of the longitudinal axis 220L1 of the wheel arm 220 of FIG. 12 to an angular position of the longitudinal axis 220L of the wheel arm 220 in FIG. 13. As a result, in the illustrated exemplary embodiment, the distance between the base G and the wheel axle 320 is increased and/or the distance between the wheel axle 230 and the frame 320 of the vehicle 300 is reduced. In the exemplary embodiment shown, wherein the distance D between the ground surface G is, for example, kept substantially constant, for example by means of other, additional wheels, and/or wheel axles and/or wheel suspensions, this means that the wheel 310 by means of the lift actuator 600 can be lifted to a desired height H above ground surface G by means of this device wherein the wheel suspension 200 of the vehicle 100 and the spring device 100 also includes a lift actuator 600 coupled thereto. In other words, this assembly of the spring device 100 and the lift actuator 600 forms a so-called lift axle for one or more wheels of the vehicle. Similarly to that described above, the control of the pressure of the compressed air or the hydraulic fluid for the lift actuator 600 may be controlled by means of a suitable compressed air circuit 400 or alternatively a suitable hydraulic circuit and a suitable controller 500 coupled thereto.

According to an embodiment, this compressed air circuit 400 and associated controller 500 may be configured to control both the pressure in the gas of the internal cavities 132 of the elongated elastic elements 130 of the spring device 100 and control the movement and/or force generated by controlling the lift actuator 600. As described above, in a simple embodiment, the compressed air circuit 400 and the controller 500 may be configured so that:

in a driving mode, the lift actuator 600 is not power-assisted and/or is freely movable and internal cavities 132 of the elongated elements 130 of the spring device 100 are supplied with compressed air under a suitable pressure, for example a pressure of 2 bar or more, for example in the range of 6 bar to 14 bar or more, for absorbing a load L and/or controlling the distance D between the ground surface and the frame 320 of the vehicle 300, preferably the spring device 100 being configured so that the associated wheel 310 of the associated wheel suspension 200 is supported on the ground surface G; and/or in a lift mode, the internal cavities 132 of the elongated elements 130 of the spring device 100 are not actuated, or in other words are not supplied with compressed air under a suitable pressure, for example no longer supplied with a pressure in the range of for example 2 bar or more, or for example 6 bar to 14 bar or more, and/or wherein the lift actuator 600 is actuated with compressed air so that the torsion RF applied to the internal profile 110 by the lift actuator 600 is high enough to permit a rotation of an coupled wheel arm 220 of the wheel suspension 200 so that an associated wheel 310 of a vehicle 300 can be lifted up from the ground surface G.

FIGS. 14 and 15 show an alternative embodiment in which the lift axle is realized by means of a resilient double-acting actuator 700. As can be seen, this resilient double-acting actuator 700 comprises two spring devices 100, one of the two spring devices 100 functioning as a lift actuator 600 of the lift axle as described above. As can be seen, the two spring devices 100 are radially coupled so that the internal profile 110 of the first actuator 1000 coincides with the external profile 2120 of the second actuator 2000 for rotation about a common longitudinal axis along the central longitudinal axis R. In other words, the internal profile 110 of the spring device 100 is arranged rotatably about the central longitudinal axis R similar to that described above by means of the elongated elements 130 of the first actuator 1000 arranged between the external profile 120 provided via the mounting bracket 210 to the frame 320 and the rotatable, internal profile 110 attached to the wheel arm 220 and similarly as described above can develop a force and a torsion according to the direction of the arrow RB, i.e. according to a direction that absorbs a higher load or increases the distance D when increasing the pressure in the internal cavities of the elongated elements 130. In the driving mode as shown in FIG. 14, similar to FIG. 12, the lift actuator 600 formed by the second actuator 2000 is released, or in other words not supplied with compressed air or with compressed air wherein the pressure does not exceed a certain minimum limit value, for example, 2 bar, or any other suitable value. It is further understood, as can be seen, that the internal profile 110 of the first actuator 1000 also forms the external profile 2120 of the second actuator 2000 which functions as the lift actuator 600 and is also constructed similarly to the spring device 100 as described above. However, it is understood that here the external profile 2120 is rotatably arranged around an internal profile 2110 which is fitted to the frame 320 via the mounting bracket 210, or which, for example, is fixedly connected in some other way to the external profile 120 of the first actuator 1000. It is thereby understood that the internal profile 2110 and the external profile 2120 of the second actuator 2000 are formed in such a way that they allow rotation through a certain angle of the external profile 2120 about the common longitudinal axis R by means of elongated elements 2130 applied between the external profile 2120 and the internal profile 2110 with an internal cavity 2132 which are similar to the elongated elements 130 of the first actuator and function in a similar manner as described above. The state of the elongated elements 2130 of the second actuator 2000 as shown in FIG. 14 corresponds substantially to the state as shown in FIG. 3, wherein the cavities in the elongated elements 2130 are substantially completely compressed. In the lift mode shown in FIG. 15, similar to that described above with respect to FIG. 13, the lift actuator 600, or in other words the second actuator 2000 formed by the external profile 2120, internal profile 2110 and the interposed elongated elements 2130, actuated so that a torsion RF is applied by the internal profile 110 for rotation of the wheel arm 220 about the central longitudinal axis R as indicated by arrow RF, for example from the angular position 220L1 of FIG. 14 to the angular position 220L in FIG. 15, wherein, when the distance D is kept substantially constant, for example by other wheels, the wheel 310 is lifted a certain height H above the ground surface G as shown. Similar as described above, in the lift mode, the first actuator 1000, formed by the external profile 120, internal profile 110 and the elongated elements arranged therebetween, is for example not actuated, for example by no longer supplying pressurized air to the elongated elements. It is understood that alternative embodiments are possible for controlling the first and second actuators similar to those described above with respect to the spring device 100 and the lift actuator 600 in the exemplary embodiment in FIGS. 12 and 13.

Furthermore it is understood that the double-acting resilient actuator 700, according to the example shown, thus comprises two radially arranged actuators 1000, 2000 which are similar in design to the spring device 100, but are each configured at the increasing of the pressure in the respective elongated elements 130 to allow rotation in an opposite direction of rotation in a certain range of motion of the actuator range between two extreme angular positions. The elongated elements 130, 2130 can thereby at least partially overlap along the longitudinal direction, and can for instance have a similar length as shown in FIG. 8. However, it is understood that alternative embodiments are possible, wherein the elongated elements 130, 2130 are for instance 20% or more, preferably 50% or more, for example 80% or more of their total length.

FIGS. 16 and 17 show another alternative embodiment in which the lift axle 600 is realized by means of a resilient double-acting actuator 800. Here, however, the two spring devices 100, one of which functions as a lift actuator 600, are axially coupled with their internal profile 110 for rotation about a common longitudinal axis along the central longitudinal axis R. In other words, similar to the exemplary embodiment of FIGS. 14 and 15, there is a first actuator 1000 and a second actuator 2000 configured as a spring device 100 and cooperating about a double-acting actuator 800, but here the two actuators 1000 and 2000 are not arranged radially nested in each other, but arranged axially next to each other. According to the exemplary embodiment shown, they thereby make use of a common external profile 120 which extends over the combined length of both actuators 1000 and 2000. In this case, a respective internal profile 110, 2110 is arranged for each of the actuators 1000, 2000, surrounded by respective elongated elements each extending only along the length of the respective actuators 1000, 2000, i.e. according to the direction of the central longitudinal axis R. The internal profiles 110, 2110 of both actuators 1000, 2000 are coupled and/or fixedly connected with each other so that they are both connected to the wheel arm 220 so as to each generate a respective torsion in an opposite direction of rotation RF, RB similar to that described above. According to the exemplary embodiment shown, the cross-section of the internal profile 110, 2110 of each of the internal profiles 110, 2110 is adapted to a rotation in that particular direction, but it is understood that alternative embodiments are possible, for example the internal profile 110, 2110 of both actuators 1000, 2000 has an identical cross-section and/or, just like the external profile 120, 2120, is formed as a one-piece continuous profile. It is understood that numerous alternative exemplary embodiments are possible with regard to the internal and external profile of both actuators 1000, 2000, as long as the respective elongated elements 130 arranged therebetween can be controlled separately, similarly as described above. For example, similarly as described above and schematically shown in FIG. 16, the associated detail sections A and B in a drive mode actuator 1000 can be actuated, while actuator 2000 is not actuated. In the lift mode, for example, actuator 2000 can be actuated similarly to that described above, while actuator 1000 is not actuated.

Similarly to that described above, it is understood that alternative embodiments are possible for controlling the two actuators 1000 and 2000 that together form the double-acting actuator 800, for example by means of a suitable compressed air circuit 400 and a suitable controller 500. Note that in the partial section shown in the perspective view of FIGS. 16 and 17 in order to more clearly show the specific shape of the internal profile of both actuators 1000 and 2000, the elongated elements 130, 2130 are not shown, but the elongated elements each extend over approximately a similar length to the length of the associated internal profiles 110.

Furthermore it is understood that still further alternative applications are possible for a resilient double-acting actuator 700, 800 comprising two spring devices 100 coupled together, so long as, in general, both spring devices are configured to realize rotation about the central longitudinal axis R, whereby at increasing the pressure in the gas of the first spring device a rotation around the central longitudinal axis R is realized according to a first direction of rotation and when the pressure in the gas of the second spring device is increased a rotation around the central longitudinal axis R is realized according to a second direction of rotation which is opposite to the first direction of rotation.

Furthermore it is also understood that such a spring device 100 can also be used in other applications as a resilient single-acting actuator which can be actuated by changing the pressure in the gas in the gas-filled internal cavity 132 of the elongated elastic elements 130, so that by increasing the pressure in the gas a rotation about the central longitudinal axis R can be realized according to a determined direction of rotation. It is thereby understood that these actuators comprising such spring devices 100 can realize a predetermined angular displacement, or in other words can realize an angular displacement between two predetermined extreme angular positions limiting the movement of the actuator.

FIGS. 18 to 20 show an exemplary wheel suspension with a lift axle similar to FIGS. 12 and 13, but in which, instead of an actuator, a passive retraction device 900 such as, for example, a retraction spring, is used to lift the wheel axle from the ground in the lift mode, when releasing the spring device. The spring device 100 can then be actuated in the driving mode so as to overcome the spring force of the retraction device 900 by applying a sufficiently high pressure to the internal cavities of the spring device 100. According to the illustrated embodiment, the retraction device is configured as a suitable spring 900, which at one end 902 is connected to the internal profile 110 and at the other end 904 to the external profile 120 or the mounting bracket 210 or the frame 320. It is understood that alternative embodiments are possible in which a spring is arranged so that it develops a force which applies a bias to the spring device 100 which produces a torsion in the direction RF to enable a lift mode and which can be overcome by the torsion in the opposite direction which can be generated by applying a sufficient high pressure in the internal cavity 132 of the elongated elements of the spring device 100.

It is understood that alternative embodiments are possible of devices and/or assemblies wherein a resilient single-acting actuator 101, similar to that shown in, for example, FIGS. 1 to 13 and FIGS. 18 to 19 may be employed. Such a single-acting actuator 101 thereby includes a spring device 100 according to one or more of the embodiments as described above and is configured to be actuated by changing the pressure in the gas in gas-filled internal cavity 132 of the elongated elastic elements 130, so that by increasing the pressure in the gas a rotation of the internal profile 110 relative to the external profile 120 about the central longitudinal axis R can be realized according to a determined direction of rotation.

Furthermore it is also understood that alternative embodiments and applications are possible for a resilient double-acting actuator 700, 800, similar to, for example, as described above with reference to FIGS. 14 to 17. The resilient double-acting actuator 700, 800 thereby comprises two mutually coupled spring devices 100. These spring devices 100 are configured to realize a rotation about the central longitudinal axis R of an internal profile 110 relative to an external profile 120 of at least one of the spring devices 100, whereby upon increasing the pressure in the gas of the first spring device or the resilient actuator 1000 realizes a rotation about the central longitudinal axis R according to a first direction of rotation and upon increasing the pressure in the gas of the second spring device or resilient actuator 2000 a rotation is realized around the central longitudinal axis R according to a second rotational direction opposite to the first direction of rotation. An alternative application for such a single-acting actuator is, for example, a chain tensioner, belt tensioner, the actuation of a valve, for example a rotary valve, an actuator for a rotation with a limited angular displacement, and/or a reciprocating movement between two angular positions, whereby, for example, no longer transmission mechanisms are required to convert linear motion into rotation, while preserving a resilient effect.

According to embodiments of a resilient double-acting actuator 700 similar to those described with reference to FIGS. 14 and 15, the two spring devices 100 are radially coupled or nested or arranged within each other so that the internal profile 110 of the first spring device also called first actuator 1000 coincides and/or is radially coupled to the external profile 2120 of the second spring device or second actuator 2000 for rotation about a common longitudinal axis along the central longitudinal axis R by means of the respective elongated elastic elements 130, 2130.

Finally, with reference to FIG. 21, which shows an embodiment similar to that shown in FIG. 2, the resilient action by means of a translation of the internal profile 110 with respect to the external profile 120 of such a spring device 100 is schematically shown. It is thereby understood that the spring device 100, in addition to a rotary resilient action, as described above, for example with reference to FIGS. 1 to 3 by means of the elongated elastic elements 130 is also able to show a resilient action with respect to static and dynamic loads SL by means of a translation of the internal profile 110 with respect to the external profile 120 or vice versa, for example in a direction transverse to the central longitudinal axis R. According to the exemplary embodiment shown, wherein the spring device 100 is used in a wheel suspension 200 of a vehicle moving in a direction of travel DR over a ground surface G, for example, a dynamic load SL caused by an obstacle GI, such as at, for example, a traffic island, curb, etc., in a for instance substantially horizontal direction via the wheel 310 can transfer onto the wheel axle 230 and also the wheel arm 220. It is thereby understood that the direction of travel DR as well as the direction of the load SL are substantially transverse to the central longitudinal axis R of the spring device 100. Particularly in the state of the spring device 100 shown in FIG. 21, it is understood that such a load SL cannot be accommodated by rotation of the wheel arm 220 since the longitudinal axis of the wheel arm 220 is substantially aligned with the direction of the load SL. In this case, as shown, the spring device 100 can still achieve a resilient action by a resilient translation T1 of the internal profile 110 with respect to the central longitudinal axis R, or in other words with respect to the external profile 120 in a direction transverse to the central longitudinal axis R. As can be seen, this can be achieved in that the elongated elastic elements 130 on the side subject to the highest load will be compressed more than the other elastic elements 130, and in particular the opposing elastic element 130. As can be seen the shock load T2 as schematically shown with arrow T2 on the mounting bracket 210, or in other words the frame 210 of the wheel suspension 200 and also on the frame 320 of the vehicle, as a result will be lower than the shock load SL on the wheel 310. It is also understood that the reaction force on the bearings of, for example, the wheel axle 230 also caused by the shock load SL will also be reduced. Furthermore it is also understood that in addition to a resilient action of the spring device 100 based on a rotation about the central longitudinal axis R, the ability to also provide a resilient action by means of realizing a translation of the internal profile 110 with respect to the external profile 120 gives rise to an improved resilient action of the spring device 100, especially when used in a wheel suspension of 200 of a vehicle 300, as a higher level of comfort can thus be realized for occupants, cargo, animals, etc. transported by the vehicle. Furthermore it is also understood that such a resilient action on the basis of a translation of the internal profile 110 with respect to the external profile 120, possibly in combination with a rotation about the central longitudinal axis R, can also be realized in any suitable alternative angular position of the wheel arm than the angular position shown in FIG. 21. The angular position from FIG. 21 and the associated load was only chosen to describe in a simple and schematic way the resilientaction on the basis of a translation. It is thus understood that, depending on the specific load that the spring device 100 is subjected to, the resilient action of the elongated elements 130 will guarantee an appropriate rotation and/or translation as described above. It is understood that alternative embodiments are possible, wherein for example with a load with a component according to a vertical direction and/or a horizontal direction and/or any suitable combination thereof, transverse to the central longitudinal axis, at least partly by means of a translation of the internal profile 110 with respect to the external profile, along a direction transverse to the longitudinal axis R is absorbed, which allows for example to better absorb shocks with less risk of deformation or damage to bearings or other elements. Furthermore it is understood that according to the illustrated embodiments of the spring devices 100 and/or resilient actuators, there can also be any suitable combination of translation and rotation of the internal profile 110 relative to the external profile 120 by means of the elongated elastic elements.

FIGS. 22 to 26 show a variant embodiment of a wheel suspension 200 such as the embodiment of FIG. 1, wherein similar elements are designated by similar references and wherein these elements function in a similar manner as described above. It is understood that, similar to the embodiment of FIG. 10, as shown, only three elongated elastic elements 130 with internal cavities 132 are provided in this embodiment. According to the illustrated embodiment of FIG. 22, the internal profile 110 and the external profile 120 have a basic circular shape. As described in more detail below, the internal profile 110 includes projections 118 facing the external profile and the external profile 120 includes projections 128 facing the internal profile 110. These projections 118, 128, like the internal profile 110 and the external profile 120, include an elongated shape extending along the direction of the longitudinal axis R. It is thus understood that these projections, according to the illustrated exemplary embodiment, are for example elongated, plate-shaped elements, have a cross-section as seen in FIG. 22, the longitudinal axis of which extends along the direction of the central longitudinal axis R. As shown, the internal profile 110 comprises three such projections 118 which are distributed at different positions around the circumference of the internal profile 110. According to the illustrated exemplary embodiment, the protrusions are evenly distributed around the circular circumference of the internal profile, in other words, at angular positions with an intermediate distance corresponding to 120°. As further can be seen, three projections 128 were also provided on the internal periphery of the external profile 120, extending in the direction of the internal profile 110. According to the exemplary embodiment shown, they are also distributed evenly over the circular internal circumference of the external profile 120, in other words at angular positions with an intermediate distance corresponding to 120°. As can be seen, the internal profile 110 is arranged in the external profile 120 so that the projections 118 of the internal profile 110 are at an angular position between the angular positions of two projections 128 of the external profile 120, and vice versa. In other words, about the central longitudinal axis R, the projections 118 of the internal profile 110 and the projections 128 alternate.

As further can be seen in FIG. 22, the embodiment of the spring device 100 of the wheel suspension 200 shown comprises three elongated elastic elements 130. Similarly as described above, the internal profile 110 is supported by the three elongated elastic elements 130 arranged at different angular positions about the central longitudinal axis R between the internal profile 110 and the external profile 120. As can be seen, each elongated element 130 is bounded along a radial direction, i.e. along a direction perpendicular to the central longitudinal axis R, by the external circumference of the internal profile 110, and on the opposite side by the internal circumference of the external profile 120. Along a tangential direction, i.e. along a direction around the longitudinal axis R, each of the elastic elements 130 is partly limited at a first end by one of the projections 118 of the internal profile 110, and on the opposite second side, partially bounded by one of the projections 128 of the external profile. Partly limited means that, as can be seen, according to this embodiment, at least a part of these first and second sides of the elastic element 130 can move beyond the limit of the projections 118, 128, as will be made clear in more detail below.

Similar to FIG. 1, FIG. 22 shows that this embodiment preferably comprises elongated elastic elements 130 comprising a gas-filled internal cavity 132. According to the exemplary embodiment shown, the gas is, for example, compressed air present in this internal cavity 132 under a predetermined pressure. It is understood that the internal cavity 132 is configured and/or closed by elements, such as a nipple, valve, coupling, which are configured to maintain and/or control the amount of gas in the internal cavity 132. In other words, according to certain embodiments, for example, the pressure in the gas in the internal cavity 132 can be determined so that a desired value can be set and/or maintained. It is understood that according to certain embodiments this pressure can be set, for example at a certain load, and then, for example, by supplying and/or discharging a certain amount of gas until the desired pressure is reached, for example at a certain load, after which, for example, the supply and/or discharge of gas from a suitable source of gas under pressure is at least temporarily suspended. For example, the elongated elastic elements 130 can be formed in a simple manner by means of a compressed air hose or any other suitable hose with an internal cavity such as for example an air chamber. According to one embodiment, this hose can comprise an internal cavity closed on both sides, or alternatively have an opening and/or a connection on at least one side, for instance for a connection to a suitable compressed air circuit.

According to the example shown, the pressure of the compressed air in the internal cavity 132 is, for example, in the range of 1 bar to 50 bar, for example in the range of 2 bar to 30 bar, for example in the range of 6 bar to with 15 bar. For example, the pressure was applied by means of a suitable source of compressed air which was temporarily coupled to a suitable nipple providing access to the internal cavity 132 of the elongated elastic element 130. After removal of the source of compressed air, the nipple or valve operates so that no compressed air can escape from the internal cavity 132, for example by means of a suitable check valve, shut-off valve, or the like. The position shown in FIG. 22 shows the spring device 100 and the associated wheel suspension in an angular position achieved after applying a desired gas pressure in the internal cavity 132 of the elastic elements 130 at a given load L as schematically represented by the arrow in FIG. 22. This pressure corresponds, for example, to a pressure of 6 bar. Furthermore it is also understood that the elongated elastic elements 130, as well as their internal cavity, include a longitudinal axis 132L which is substantially parallel to the central longitudinal axis R.

As already described above, with a changing load L, the angular position of the longitudinal axis 220L of the wheel arm 220 about the longitudinal axis R of the torsion device 102 will change, as further explained with reference to FIGS. 23 and 24. FIGS. 23 and 24 show the same embodiment as in FIG. 22 in a different state. As shown schematically, in the state of FIG. 23 a greater load L is applied to the wheel suspension 200 than in the state of FIG. 22 as indicated schematically by a larger arrow L. In the state of FIG. 24 an even greater load L is applied to the wheel suspension is then in the state of FIG. 23 as schematically shown with an even larger arrow L.

According to the exemplary embodiment shown, in which, for example, the amount of gas in the internal cavity 132 of the elastic elements 130 is kept constant, it is understood that with increasing load, the increasing torsion exerted by internal profile 110 around the central longitudinal axis R causes that the internal cavity 132 of the elongated elastic elements 130 is compressed. Thereby, the pressure in the gas in the internal cavities 132 will increase until the elastic elements 130 exert a torsion on the internal axle sufficient to absorb the torsion caused by the load L, whereby, for example, a new equilibrium can be achieved, as shown, for example, in FIG. 23. It is understood that by changing the load in this manner, the angular position of the longitudinal axis 220L is changed with respect to the longitudinal axis R. For reference, the angular position from the state in FIG. 22 is shown by dash-dot line 220L1 in FIGS. 23 and 24. However, it is understood that the evolution from the state in FIG. 22 to that shown in FIGS. 23 and 24 can also be obtained by changing and/or controlling the pressure of the gas in the internal cavity 132 as, for example, already described above. In the exemplary embodiment shown in FIGS. 22 to 24, where the load L changes, and where, for example, according to an exemplary embodiment, the amount of gas comprised in the internal cavities 132 is kept constant, the pressure in the gas in the internal cavities 132 can change under influence of the change in volume of the internal cavities 132, for example from 6 bar in FIG. 22, to a 10 bar in FIG. 23 and to 14 bar in FIG. 24. However, it is understood that alternative embodiments are possible in which any suitable compressed air circuit is connected to the internal cavities 132 configured to control the pressure and/or the amount of gas in the internal cavities 132 in a desired manner. For example, this compressed air circuit can be configured to regulate the pressure in the internal cavities 132 to a desired predetermined value even with a changing load, for example by means of a suitable pressure regulator. According to an alternative embodiment, a compressed air circuit connecting a plurality of spring devices together can be configured to realize an exchange of an amount of gas between the spring devices and/or a reservoir. However, it is understood that alternative embodiments are possible of such a compressed air circuit as described above, as well as below in more detail.

It is understood that with increasing load the angular position of the longitudinal axis 220L further changes in the same direction as compared to the angular position 220L1 from FIG. 22. Thereby it is also understood that due to the torsion exerted by the load on the internal axle 110 i.e. with respect to the external axle 120, with increasing load, the distance is reduced between a projection 118 of the internal axle 110 and an adjacent projection 128 of the external axle 120, between which an elastic element 130 is arranged. In other words, an angular displacement of the spring device 100 corresponds to a change in distance, i.e. the distance along the tangential direction, or in other words, the difference between their angular positions about the central longitudinal axis R changes.

Furthermore it is understood that as shown in FIGS. 22 to 24, the space for the elastic element 130 located between these protrusions 118 and 128 changes as the distance between these protrusions 118 and 128 changes. As shown in more detail in FIG. 25, as the distance 122L between the projection 128 of the external profile 120 and the proximal projection 118 of the internal profile 110 as shown by the arrows decreases, a part of the elastic element 130 through openings 115, 125 will be able to expand beyond a radial part 124, 114 of the projections 118, 128. Therefore it is understood that the projections, when moved toward each other, are configured so as to allow the elastic element 130 to expand through these apertures beyond the part bounded by the radial part 114, 124 of these projections 118, 128.

In this way, as explained below in detail with reference to FIGS. 26 and 27, the effective area can be determined for a particular operating range of the spring device 100, for instance a particular range of angular positions of the spring device 100 which are used during the operation of the spring device 100. As indicated schematically by the arrow and letter A, the effective area of the spring device 100 is determined by the ratio of force developed by the elastic elements 130 in relation to the pressure of the gas in the internal cavity 132 of the elastic elements 130. The effective area A of the spring device 100 thus represents the force-carrying area of the spring device 100, and is a parameter known to those skilled in the art of, for example, air springs. In the case of air springs, the effective surface area can be determined, for example, on the basis of this formula: effective surface area A=force exerted by the spring device F/pressure of the gas in the spring device. Thus, if the pressure in the gas in the spring device 100 is kept constant, the effective area A will be proportional to the force exerted by the spring device 100. This allows to determine the evolution of the effective area A of the spring device 100 in different states of the spring device 100, by measuring the force exerted by the spring device F in these different states of the spring device 100 at a constant pressure of the gas in the spring device 100. For the spring device 100 according to the embodiments described herein, the effective area A will thus be proportional to the torsion developed by the spring device 100 when the pressure in the gas in the internal cavities 132 of the elastic elements 130 is controlled so as to keep the pressure constant.

Different angular positions of the spring device 100 according to the embodiment of FIGS. 22 to 25 are shown in FIG. 26. Thereby, when designating the angular positions, i.e. angular positions around the central longitudinal axis R, the position of the external profile 120 is kept constant, while the internal profile 110 is brought into a different angular position about the central longitudinal axis R. It is understood that according to alternative embodiments, the angular positions may be determined by any suitable relative angular displacement about the central longitudinal axis R of the internal profile 110 with respect to the external profile 120 or vice versa. According to the illustrated embodiment of FIG. 26, the spring device has an operating range of 0° to 50°. The position of 0° corresponds almost to the position shown in FIG. 22, that of 25° to the position shown in FIG. 23, and that of 50° to the position shown in FIG. 24. This operating range corresponds, for example, to a range of angular positions between two extreme angular positions during the use or operation of the spring device 100. Therefore, according to the exemplary embodiment shown, the 0° angular position can correspond to a maximum distance D or height above the ground surface G of the frame 320 of the vehicle 300, and the 50° angular position with a minimum distance D, whereas the 25° angular position corresponds to a desired average distance D. The angular position indicated at −20° in FIG. 26 according to this embodiment corresponds to an assembly position, in which the distance 122L between two projections 118, 128 between which the elastic element 130 is arranged is maximum, so as to allow a simple and efficient assembly of the elastic elements 130.

FIG. 27 shows the evolution of the reaction moment of an embodiment of a wheel suspension 200 with a spring device 100 as shown in FIG. 22, and is indicated by arrow XXII. For comparison, the evolution of the reaction moment of the embodiment of FIG. 1 is shown and indicated by arrow I. The evolution of the reaction moment is determined for these embodiments at a constant pressure of the gas in the elastic elements of 15 bar. As indicated above with reference to FIG. 26, the reaction moment forming the y-axis of the graph is measured at various angular positions of the spring device 100, the range of 0° to 50° forming the operating range of the embodiment of the spring device 100 of FIG. 22. For the embodiment of FIG. 1, the angular position of 0° corresponds approximately to the state shown in FIG. 1, the angular position of 45° corresponds substantially to the state shown in FIG. 3 and the state shown in FIG. 2 corresponds substantially to a angular position of 20°.

As indicated above, at such a constant pressure of the gas in the spring device, the reaction moment is proportional to the effective area of the spring device 100. It is thereby understood that in the operating range of 0° to 50° of the embodiment of the spring device 100 of FIG. 22, the variation of the effective area is less than the variation of the effective area of the embodiment of the spring device of FIG. 1. As can be seen in the range of 10° to 50°, the reaction moment remains substantially constant at 3100 Nm, and in the range from 0° to 10°, the variation is limited to about 250 Nm, or less than 10% of the mean value of the reaction moment in the operating range. It is therefore understood that in the operating range of this embodiment of the spring device, the effective area, or also the reaction moment at a constant pressure, or also the torsion and/or the force developed by the spring device, exhibits a variation of 50% or less, at preferably 25% or less, preferably 10% or less of the mean value over this operating range. It is understood that thereby this operating range corresponds to a certain range of the angular positions of the spring device 100 as described above.

As can be seen, the reaction moment of the embodiment of FIG. 1 varies in an operating range of 0° to 45° from about 400 Nm to 3200 Nm, with a mean value of about 1800 Nm being achieved at about 20°. In other words, in the operating range there is a variation of 2800 Nm, which corresponds to about 150% of the mean value of 1800 Nm in the operating range. It is understood that a similar variation of the effective area of the spring device 100 is the case.

Such spring devices 100, in which the variation of the effective area is limited in the operating range of the spring device 100, are particularly advantageous when they are used in vehicles with a plurality of wheels arranged one behind the other, similar to those already described above with reference to FIG. 9. That is to say, for example, one after the other along the central longitudinal axis 300L corresponding for instance to the direction of travel of the vehicle 300. As shown in FIG. 28, when a compressed air circuit 400 is used which is configured to actuate both spring devices 100 of the two wheel suspensions 200 connected one after the other to each other so that an exchange of a quantity of gas between the elastic elements 130 of the different wheel suspensions becomes possible. In this way, the spring devices 100 of the wheel suspensions will be able, even if they are in a different angular position as schematically shown in FIG. 28, to distribute the load L equally or evenly between both wheel suspensions. It is understood that, as illustrated with reference to FIG. 27, both spring devices 100, despite the variation in their angular position, at the same pressure, are able to generate a reaction moment whose variation is limited. When both spring devices shown in FIG. 28 are connected together, the pressure in both spring devices 100 will be substantially equal. In this way, a more even load on both wheel axles can be achieved and the risk is reduced that one of the two wheel axles is overloaded with changing angular positions.

FIG. 29 shows the evolution of the cross-sectional area of the elastic elements with respect to the angular displacement of an embodiment of a wheel suspension with a spring device 100 as shown in FIG. 22 denoted by reference XXII and the embodiment shown in FIG. 1 denoted by the reference I. Similar to FIG. 27 and as indicated above with respect to FIG. 26, the cross-sectional area of the elastic elements 130, in particular the cross-section of the internal cavity 132 of these elastic elements 130, is shown on the y-axis of the graph as a function of different angular positions of the spring device 100, the range from 0° to 50° constituting the operating range of the embodiment of the spring device 100 according to FIG. 22. For the embodiment of FIG. 1, the angular position of 0° corresponds approximately to the state shown in FIG. 1, the angular position of 45° corresponds substantially to the state shown in FIG. 3 and the state shown in FIG. 2 corresponds substantially to a angular position of 20°. Thus, the operating range of this embodiment of FIG. 1 corresponds substantially to 0° to 45°.

Furthermore it is understood that in the operating range of 0° to 50° of the embodiment of the spring device 100 of FIG. 22, the cross-sectional area of the elastic elements 130 has a linear, or substantially linear, variation. As shown in FIG. 29, the cross-sectional area, i.e. according to a cross-section transverse to the longitudinal axis of the elongated elastic elements 130, and more specifically the cross-sectional area of the internal cavity 132 thereof, is aligned at the angular position of 0° corresponds to approximately 1500 mm² and at the angular position of 50° to approximately 400 mm². It is understood that alternative embodiments are possible, where preferably the cross-sectional area of the internal cavity 132 changes linearly or substantially linearly as a function of the angular position in the operating range of the spring device 100. In other words, preferably the spring device 100 is configured so that the cross-sectional area of the internal cavity 132, which is proportional to the volume of the internal cavity 132 of the elongated elastic elements 130, has a linear or substantially linear course in the operating range of the spring device. It is thus understood that in the operating range of this embodiment of the spring device 100 the cross-sectional area as well as the volume of the internal cavity 132 has a linear course in function of the angular displacement of the internal profile 110 with respect to the external profile 120 of the spring device 100. Preferably, the variation of the cross-sectional area deviates 5% or less, preferably 3% or less, preferably 2% or less, for example 1% or less from a linear course in the operating range of the spring device 100.

As can be seen, the reaction moment of the embodiment of FIG. 1 varies in an operating range of 0° to 45° from about 1000 mm² to 500 mm². The linear course between these two values as a function of the angular position is shown by means of the dash-dot line in FIG. 29. It is understood that the actual variation of the cross-sectional area of the internal cavity 132 of this embodiment deviates markedly from this linear gradient. By way of illustration, the dash-dot line schematically represents a deviation of approximately 5% with respect to the linear course. It is understood that the actual variation of the cross-sectional area for this embodiment, in the operating range from 0° to 45°, does not remain within the limits of this deviation, or in other words deviates more than 5% from a linear course.

The linear course of the cross-section of the surface of the internal cavity 132, or in other words, the linear course of the volume of the internal cavity 132, as a function of the angular displacement of the internal axle 110 with respect to the external axle 120, in the operating range of the spring device 100, in embodiments similar to FIG. 22, is particularly advantageous when such spring devices 100 are used in an embodiment as described with reference to FIG. 28, wherein at least two identical, or substantially identical spring devices 100 are used with at least two identical, or almost identical wheel suspensions 200, and wherein these wheel suspensions 200 are arranged one after the other according to the direction of travel 300L of the vehicle 300. As described with reference to the embodiment of FIG. 28, this allows a simple compressed air circuit 400, where, in operation, after the desired pressure in the gas in the spring devices is 100 has been fitted, the spring devices 100 can be coupled together in a simple manner for exchanging the gas under pressure, for example by means of a suitable conduit, such as for example a compressed air conduit or any other suitable conduit. It is understood that, according to such an embodiment, wherein the at least two spring devices 100, as shown, are coupled together for exchanging the pressurized gas in the internal cavities 132 of the elastic elements 130, that in a state of rest, the pressure in all internal cavities 132 of the elastic elements 130 will be equal, or nearly equal. When, as shown in FIG. 28, or for instance also in FIG. 30 or 32, in such an embodiment with two wheel axles with connected spring devices 100, a first wheel axle 200 performs a certain angular displacement in a certain direction, this will result in an equal, or substantially equal angular displacement in the opposite direction of the second wheel axle 200, since the change in volume of the internal cavities 132 of the first wheel axle 200, for example a reduction, is equal to, or substantially equal to, the change in volume of the internal cavities 132, for example an increase, as a result of the linear course of the volume of the internal cavities 132 as a function of the angular displacement of the spring devices 100 in their operating range. In this way, with the total load being the same, with an angular displacement of the one of the two connected spring devices 100, the change in the volume of the internal cavities 132 will cause a displacement of the volume of compressed gas to the other spring device 100, where this volume is accommodated by an equal or almost equal angular displacement in the opposite direction. It is understood that a decrease in volume of the internal cavities 132 in one of the spring devices 100, i.e. is completely, or almost completely, compensated by an increase in volume in the other spring device 100, or in other words, that the total volume of the internal cavities 132 of both spring device remains constant, or nearly constant. It is understood that in such an embodiment, in such an operating state, wherein the sequentially arranged spring devices 100 are coupled to each other by means of a compressed air circuit 400 for exchanging the gas present in the internal cavities 132 of the spring devices, the pressure in the gas in the spring devices 100 is substantially the same, which is advantageous since the load can thus be distributed evenly over both spring devices. Furthermore, it is understood that in such a state, with the total load constant, a constant, or substantially constant pressure also remains in the gas in the internal cavities 132 of the spring devices 100, since the total volume of the internal cavities 132 of the plurality of spring devices 100 remains constant, or substantially constant, due to the linear relationship between the volume of the internal cavities of the plurality of, preferably identical, or substantially identical, spring devices 100 and the angular displacement of the internal profile 110 with respect to the external profile.

An example of an application in which such an embodiment of the spring device 100 is advantageous is shown, for example, in FIG. 30, where a trailer with two wheel suspensions arranged one after the other is schematically shown, similar to FIG. 9. When the trailer is placed in a tilted position, as shown, for instance for driving up a vehicle onto the trailer via ramps, then this load can be distributed over both wheel suspensions in a simple manner. As shown, this will also limit the load in the area of the tow hook, as well as allow a limited approach angle of, for example, 8° for the illustrated exemplary embodiment. For comparison, FIG. 31 shows an example of a similar vehicle, but with spring devices from the prior art, in which the variation of the effective surface is not or insufficiently limited. As shown, at a different angular position of the wheel axles, the spring device of the wheel axles will be loaded irregularly. As shown, in the state of FIG. 31, the rear wheel axle with the elastic elements most compressed will absorb most of the load. This will give rise to a greater load on the tow hook, as well as a larger ramp angle, since the greater reaction moment of the rear spring device will cause the rear wheel axle to take up a higher position, so that for a similar exemplary embodiment the minimum ramp angle is greater, for instance 12°.

It is understood that the advantages of this embodiment of the spring device 100 with a limited variation of the effective area A also arise in other circumstances, for example as shown schematically in FIG. 32, where both wheel suspensions 200 of the vehicle 300, arranged one after the other, are moved to a different angular position, for example in response to an irregularity in the ground surface. As shown, even here, with a very simple compressed air circuit 400, configured to exchange gas between the two spring devices 100, the load L will be more evenly distributed on both wheel suspensions 200, i.e. independent of their variation in the angular position of the coupled spring devices 100. It is understood that numerous alternative embodiments are possible, in particular with regard to the number of spring devices 100, the number of wheel suspensions, the compressed air circuit and/or the control coupled to the compressed air circuit, for example similar as described above, however it is understood that the compressed air circuit, as well as its control can be considerably simplified due to the limited variation in the effective area in the operating range of the spring devices. It is understood that thereby embodiments in which, for example, the angular position of the longitudinal axis 220 of the wheel arm 220 of one or more wheel suspensions 200 is adjusted by means of controlling the pressure of the gas in the corresponding spring devices 100, are also possible.

As can be seen in the embodiment of FIGS. 22 to 26, and particularly in the fragment of FIG. 25, the spring device 100 comprises an internal profile 110 having an external circular circumference, and an external profile 120 having an internal circular circumference. As can be seen, at the level of the elastic element 130, the distance 122D between the internal profile 110 and the external profile 120 equals the difference in the distance between the central longitudinal axis R and the external circumference of the internal profile 110D, and the distance between the central longitudinal axis R and the internal circumference of the external profile 120, or in other words the radius of the respective perimeters of the internal profile 110D and the external profile 120D according to this exemplary embodiment. It is understood that alternative embodiments are possible in the cross-sectional shape of the elongated profiles 110, 120, however preferably this shape is configured so that the projections 118, 128 effect most of the reaction moment of the spring device 100 in the operating range of the spring device 100, and not the part of the internal circumference of the external profile 120 and the external circumference of the internal profile 110 which bounds the elastic element along the radial direction. Preferably, the variation of the distance 122D between the internal profile 110 and the external profile 120 is limited at the level of the elastic element 130, i.e. in the region of the corner segment 122L defined by the projections 118, 128 on either side of the elastic element 130. Preferably, the variation is limited to 30% or less, 15% or less, preferably 5% or less.

It is understood from the illustrated embodiment that protrusion 118 protruding from the internal profile toward the external profile includes a radial part 114 configured so that the contact surface for the elastic element 130 extends in a direction 30° or less, preferably 15° or less, preferably 10° or less from the radial direction with respect to the central longitudinal axis R. Similarly, the projection 128 protruding from the internal periphery of the external profile 120 toward the internal profile 110 also includes such a radial part 124. This radial part 124 is similarly, so configured that the contact surface for the elastic element 130 extends in a direction deviating 30° or less, preferably 15° or less, preferably 10° or less of the radial direction with respect to the central longitudinal axis R. The reaction forces exerted by the elastic element 130 on the contact surfaces of the internal profile 110 and the external profile 120 due to a reaction moment are oriented mainly in a tangential direction and thus will act mainly on the radial parts 114, 124 of the projections 118, 128 extending substantially transversely of these reaction forces of the elastic element 130. The tangential parts of the internal circumference of the external profile 120 and the external circumference of the internal profile 110 do not contribute substantially, i.e., a contribution of 10% or less to the reaction moment of the spring device 100. In the different angular positions of the spring device 100, the angle of the radial parts 114, 124 with respect to the tangential direction of the reaction forces exerted by the elastic element 130 also does not change or almost does not change, which is advantageous since in this way the variation of the effective area A in the operating range of the spring device 100 is limited.

Furthermore it is understood that the distance over which the projection 118, more in particular the radial part 114 of this projection 118 of the internal profile 110 extends, is smaller than the distance 122D between the internal profile 110 and the external profile 120 at the height of the elastic element. Also, the distance over which the projection 118, more particularly the radial part 114 of this projection 118 of the internal profile 110 extends, is smaller than the distance 122D between the internal profile 110 and the external profile 120 at the height of the elastic element 130. According to the exemplary embodiment shown, it is advantageous if the radial part 114 of the projection 118 of the internal axle extends over a distance 114D in the radial direction which is greater than half the distance 122D between the internal profile 110 and the external profile 120 at the level of the elastic element 130.

According to the embodiment shown it is advantageous if the radial part 114 of the projection 118 of the internal axle extends over a distance 114D according to the radial direction that is bigger than half the distance 122D between the internal profile 110 and the external profile 120 at the level of the elastic element 130. Preferably this distance 114D is in the range from 55% to 95% of the distance 122D, preferably in the range from 60% to 90%, preferably in the range 75% to 85%. In other words, this means that, at the level of the radial part 114 of the projection 118 of the internal profile 110 against which the elastic element can abut, an opening or cavity 115 is formed according to the radial direction between the projection 118 and the internal circumference of the external profile 120. This opening 115 is configured, as can be seen, for example, in FIGS. 22 to 26, to allow in the operating range of the spring device 110 that the elastic element 130, when compressing in the space between the projections 118, 128 can expand in this cavity 115 beyond the angular position of the radial part 114 of the projection 118. This ensures, as can be seen in the angular positions 0° to 50° in FIG. 26, that the effective area of the spring device will not change or will change less at an angular displacement in the operating range of the spring device because the change in shape of the elastic elements can be absorbed without or with a limited variation of the contact area between the elastic element 130 and the radial part 114 of the projection 118. While the opening 115 is desirably kept as limited as possible to achieve maximum effective surface area, it should be configured so that the elastic element 130 at compression can expand beyond this opening, and in particular that the internal cavity 132 with gas can also expand into this opening so that the volume of this internal cavity 132 can move beyond the angular position of the radial part 114 of the projection 118. Preferably, the opening 115 is also sufficiently large to allow the elastic element to expand through this opening without undue deformation upon compression between the radial parts of the projections 118, 128. Preferably, the opening 115 extends a distance 115D along the radial direction in the range of 5% to 45% of the distance 122D, preferably in the range of 10% to 40%, preferably in the range of 15% to 25%.

Similar to that described above for the internal axle projection 118, according to the illustrated embodiment, it is advantageous if the radial part 124 of the external axle projection 128 extends for a distance 124D along the radial direction which is greater than half of the distance 122D between the internal profile 110 and the external profile 120 at the level of the elastic element 130. Preferably, this distance 124D is in the range of 55% to 95% of the distance 122D, preferably in the range of 60% up to 90%, preferably in the range 75% to 85%. In other words, this means that, at the level of the radial part 124 of the projection 128 of the internal profile 110 against which the elastic element can abut, an opening or cavity 125 is formed along the radial direction between the projection 128 and the external circumference of the internal profile 120. This opening 125 is configured, as can be seen for example in FIGS. 22 to 26, to allow in the operating range of the spring device 110° that the elastic element 130, when compressing in the space between the projections 118 128 can expand in this cavity 125 beyond the angular position of the radial part 124 of the projection 128. This ensures that, as seen in the angular positions 0° to 50° in FIG. 26, the effective area of the spring device will not change or will change less during an angular displacement in the operating range of the spring device because the change in shape of the elastic elements can be accommodated without or with a limited variation of the contact area between the elastic element 130 and the radial part 124 of the projection 128. While the opening 125 is preferably kept as limited as possible to achieve maximum effective surface area, it should be configured so that the elastic element 130 at compression can expand beyond this opening, and in particular that the internal cavity 132 with gas can also expand into this opening so that the volume of this internal cavity 132 can move beyond the angular position of the radial part 124 of the projection 128. Preferably, the opening 125 is also sufficiently large to allow the elastic element to expand through this opening without undue deformation upon compression between the radial parts of the projections 118, 128. Preferably, the opening 125 extends for a distance 125D according to the radial direction in the range of 5% to 45% of the distance 122D, preferably in the range of 10% to 40%, preferably in the range of 15% to 25%.

In order to maximize the effective area relative to the cross-sectional dimensions of the spring device 100, it is advantageous if the distance 110D between central longitudinal axis R and the external circumference of the internal profile 110 is kept as limited as possible, while taking into account the necessary minimum dimensions of the internal profile 110 in order to be able to absorb the moments and/or forces acting on the spring device 110 during operation. Preferably, the distance 120D between the internal profile 110 and the external profile 120 is greater than the distance 110D between the external circumference of the internal profile 110 and the central longitudinal axis R. Preferably, the distance 120D is 150% or more, preferably 200% or more of the distance 110D.

As can be seen, the projection 118 of the internal profile 110, according to the exemplary embodiment shown, at the end of the radial part 114 closest to the external profile 120 comprises a tangential part 116 extending in a tangential direction, in a direction away from the cavity 122 between the projections 118, 128 in which the elastic element 130 is arranged, or in other words in a direction away from the central longitudinal axis of the elastic element 130, or in other words in a direction away from the opposite projection 128 of the adjacent external profile 120 between which the elastic element 130 is arranged. This optional tangential part 116 causes the part of the elastic element 130 that expands through aperture 115 to expand beyond this aperture 115 substantially in a tangential direction, thereby helping to limit the variation of the effective area A at different angular positions in the operating range of the spring device 110. According to the exemplary embodiment shown, the projection 128 of the external profile 120 similarly comprises at the end of the radial part 124 closest to the internal profile 110 a tangential part 126 that extends according to a tangential direction, in a direction away from the cavity 122 between the projections 118, 128 in which the elastic element 130 is arranged, or in other words in a direction away from the central longitudinal axis of the elastic element 130, or in other words in a direction away from the opposite projection 118 of the nearby interior profile 110 between which the elastic element 130 is arranged. This optional tangential part 126 also causes the part of the elastic element 130 that expands through aperture 115 to expand substantially in a tangential direction beyond this aperture 115, thus helping to limit the variation of the effective area A at different angular positions in the operating range of the spring device 110. The tangential parts 116, 126 preferably extend in a direction that deviates by 15° or less, preferably 10° or less from the tangential direction about the central longitudinal axis R. In addition, the length 116D, 126D of the tangential parts 116, 126 is preferably configured so that, as seen in FIG. 26, they extend over substantially the entire operating range of the spring device 100, for example, 80% or more of the operating range of the spring device, the distance between the profile 120 and the internal profile and the respective projections 118, 128, for the part of the elastic such element 130 which expands beyond the respective openings 115, 125 so as to limit the variation in the effective area A. It is therefore understood that in the exemplary embodiment shown, the elastic element 130 expands beyond at least one of the respective openings 115, 125 of the projections 118, 128 at certain angular positions of the operating range of the spring device, and more particularly also the internal cavity 132 which is preferably filled with compressed gas, such as, for example, compressed air.

It is understood, according to the exemplary embodiment shown, that the operating range of the spring device 100 is an angular displacement of 50°. Preferably, the operating range of such an embodiment allows an angular displacement greater than 45°. However, it is understood that alternative embodiments are possible, wherein the operating range involves an angular displacement of 20° or more, preferably 30° or more.

It is understood that numerous alternative embodiments and/or combinations thereof are possible, using for instance non-internal and/or external profiles 110, 120 with a non-circular cross section, such as for instance polygons, polygons with rounded corners. Furthermore, it is understood that embodiments are possible with a different number of elastic elements, and consequently a different number of corresponding projections 118, 128 between which the elastic elements are arranged, than the three elastic elements shown in FIGS. 22 to 31, such as, for example, four, five or more elastic elements. Furthermore it is understood that this embodiment of the spring device can also be used as a resilient single-acting or double-acting actuator similar to that described above.

It is understood that numerous combinations and variant embodiments are possible without departing from the scope of protection as defined in the claims.

The invention claimed is:

1. A spring device for a wheel suspension for a vehicle, the spring device comprising an elongated elastic torsion device configured to rotate about a central longitudinal axis (R) at a load (L), the torsion device comprising:

an elongated internal profile having a longitudinal axis along the central longitudinal axis (R);

an elongated external profile comprising an elongated cavity having a longitudinal axis along the central longitudinal axis (R), at least three elongated elastic elements having a longitudinal axis parallel to the central longitudinal axis (R);

wherein the internal profile and the elongated elastic elements are at least partially located in the cavity of the external profile, wherein the elongated elastic elements, respectively, are arranged at different angular positions about the central longitudinal axis (R) between the internal profile and the external profile so that a rotation about the central longitudinal axis (R) is realized under load by an elastic deformation of the elongated elastic elements, wherein the elongated elastic elements comprise an internal cavity configured to comprise a pressurized gas, wherein the internal profile comprises at least one protrusion or projection towards the external profile abutting one side of a respective elastic element, wherein the external profile comprises at least one projection towards the internal profile abutting the opposite side of a respective elastic element, wherein each of the elastic elements is partially bounded on two opposite sides by the projection of the internal profile and the projection of the external profile, respectively, wherein the respective projections of the internal profile and the external profile comprise a radial part:

against which the elastic element can abut; and wherein a combined radial extension of the radial part of the internal projection and the radial part of the external projection is greater than the radial distance between the internal profile and the external profile abutting the elastic element on either side, such that the projections are configured to physically block one another from rotating past each other;

wherein the spring device has a respective opening at the radial part of the respective projection of the internal profile or the external profile according to the radial direction, respectively between the respective projection and the internal circumference of the external profile or the external circumference of the internal profile, respectively, and wherein a portion of the elastic element expands in a substantially tangential direction through this opening beyond the angular position of the radial part during compression.

2. The spring device of claim 1, wherein the projections are so configured that:

at an angular displacement in the operating range of the spring device, an area (A) of the spring device exhibits a variation of 50% or less, and wherein the operating range is 20° or more; and/or in the operating range of the spring device, the course of the cross-sectional area and/or the volume of the internal cavity of the elastic elements as a function of the angular displacement of the internal profile relative to the external profile of the spring device, has a course that deviates 5% or less from a linear course.

3. The spring device of claim 1, wherein the distance of the radial part of the respective projections of the internal profile and the external profile extends in the radial direction in the range from 55% to 95% of the distance between the internal profile and the external profile at the level of the elastic element.

4. The spring device according to claim 3, wherein the respective opening is configured to allow the elastic element and its internal cavity to expand through the respective opening beyond the angular position of the radial part.

5. The spring device according to claim 4, wherein the respective projection at the end of the respective radial part located closest to the external profile or the internal profile respectively is a respective tangential part extending along a direction deviating 15° or less from a tangential direction.

6. The spring device according to claim 1, wherein the spring device furthermore comprises a compressed air circuit and a controller for adjusting gas pressure in the internal cavity:

at a predetermined gas pressure; and/or in function of reaching a desired angular position of the torsion device; and/or in function of reaching a desired spring constant of the torsion device.

7. A resilient single-acting actuator comprising a spring device according to claim 1, wherein the single-acting actuator is configured to be actuated by changing the pressure in a gas in the interior cavity of the elongated elastic elements, so that by increasing the pressure in the gas, a rotation of the internal profile relative to the external profile about the central longitudinal axis (R) can be realized according to a certain direction of rotation.

8. A resilient double-acting actuator comprising two spring devices according to claim 1 coupled together, wherein both spring devices are configured to realize a rotation about the central longitudinal axis (R) of the internal profile relative to the external profile of at least one of the spring devices, wherein upon increasing the pressure in a gas in the internal cavity of the elongated elastic elements of the first spring device a rotation about the central longitudinal axis (R) according to a first direction of rotation is realized and upon increasing the pressure in a gas in the internal cavity of the elongated elastic elements of the second spring device a rotation about the central longitudinal axis (R) according to a second direction of rotation is realized which is opposite to the first direction of rotation.

9. A resilient double-acting actuator according to claim 8, wherein the two spring devices are radially coupled so that the internal profile of the first spring device coincides and/or is radially coupled to the external profile of the second spring device for rotation about a common longitudinal axis along the central longitudinal axis (R).

10. A resilient double-acting actuator according to claim 8, wherein the two spring devices coincide with their internal profile and/or are axially coupled for rotation about a common longitudinal axis along the central longitudinal axis (R).

11. An assembly comprising two or more spring devices according to claim 1, wherein the assembly comprises two or more torsion devices; and furthermore comprises a compressed air circuit for coupling the gas supply of two or more torsion devices; and/or wherein the compressed air circuit is configured to control the compressed air in function of distributing the load between the two or more torsion devices.

12. A wheel suspension for a vehicle comprising a spring device according to claim 1 and/or a resilient single-acting actuator comprising a spring device according to claim 1, wherein the single-acting actuator is configured to be actuated by changing the pressure in a gas in the interior cavity of the elongated elastic elements, so that by increasing the pressure in the gas, a rotation of the internal profile relative to the external profile about the central longitudinal axis (R) can be realized according to a certain direction of rotation, or a resilient double-acting actuator comprising two inter-coupled spring devices according to claim 1, wherein both spring devices are configured to realize a rotation about the central longitudinal axis (R) of the internal profile relative to the external profile of at least one of the spring devices, wherein upon increasing the pressure in a gas in the internal cavity of the elongated elastic elements of the first spring device a rotation about the central longitudinal axis (R) according to a first direction of rotation is realized and upon increasing the pressure in a gas in the internal cavity of the elongated elastic elements of the second spring device a rotation about the central longitudinal axis (R)

according to a second direction of rotation is realized which is opposite to the first direction of rotation, wherein:

the wheel suspension comprises a wheel arm having a wheel axle for mounting a wheel; and the torsion device is configured to apply the wheel arm rotatably about the longitudinal axis (R) to a frame of a vehicle by applying the internal profile to the wheel arm and the external profile on the frame of the vehicle or vice versa.

13. A vehicle comprising one or more wheel suspensions according to claim 12, wherein the one or more wheel suspensions are mounted on the frame of the vehicle.

14. The vehicle of claim 13, wherein the vehicle also comprises a compressed air circuit coupled to the wheel suspensions for determining the pressure of a gas in the internal cavities of the elongated elements of the torsion devices of the wheel suspensions.

15. The vehicle of claim 14, wherein the vehicle also comprises a controller coupled to the compressed air circuit configured, by altering the pressure of a gas in the internal cavities of the elongated elements of the torsion devices of the wheel suspensions by means of the compressed air circuit, to:

determine the distance between the ground plane (G) and the frame of the vehicle; and/or determine the distance between the base (G) and the wheel axle and/or the distance between the wheel axle and the frame of the vehicle.

16. A vehicle according to claim 15, wherein the vehicle comprises at least one lift axle having an actuator coupled to the wheel arm that is engaged in a driving mode and controlled in a lifting mode for determining the distance between the ground plane (G) and the wheel axle and/or the distance between the wheel axle and the frame of the vehicle.

17. A vehicle according to claim 16, wherein the lift axle comprises a resilient double-acting actuator, wherein one of the two spring devices functions as actuator of the lift axle.

18. The vehicle according to claim 13, wherein the vehicle includes one or more of the following vehicles:

a land vehicle;

a road vehicle;

an off-road vehicle;

rail vehicle;

aeroplane;

a trailer;

a carriage;

a truck;

a tow tractor;

a tractor;

a car;

a bicycle or motorcycle;

a trike;

a quad.

* * * * *